US012463643B2

(12) United States Patent
Yancey et al.

(10) Patent No.: US 12,463,643 B2
(45) Date of Patent: Nov. 4, 2025

(54) BASELINE CALCULATION FOR SENSOR SYSTEM

(71) Applicant: Cirrus Logic International Semiconductor Ltd., Edinburgh (GB)

(72) Inventors: Gregory C. Yancey, Austin, TX (US); Rahul Gawde, Lakeway, TX (US); Matthew Beardsworth, Austin, TX (US); Michael A. Kost, Cedar Park, TX (US); Junsong Li, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 485 days.

(21) Appl. No.: 16/866,175

(22) Filed: May 4, 2020

(65) Prior Publication Data

US 2021/0152174 A1 May 20, 2021

Related U.S. Application Data

(60) Provisional application No. 62/937,528, filed on Nov. 19, 2019.

(51) Int. Cl.
| | |
|---|---|
| H03K 17/95 | (2006.01) |
| G06F 3/01 | (2006.01) |
| G06F 3/041 | (2006.01) |
| H03K 17/96 | (2006.01) |

(52) U.S. Cl.
CPC ........... *H03K 17/954* (2013.01); *G06F 3/016* (2013.01); *G06F 3/0414* (2013.01); *H03K 17/96* (2013.01)

(58) Field of Classification Search
CPC ..... G09G 2300/0421; G09G 2300/043; G09G 2300/0426; G09G 2320/045; H03K 17/954; H03K 17/96; H03K 2217/94026; H03K 2217/96062; H03K 17/945; H03K 17/9502; G06F 3/016; G06F 3/0414
See application file for complete search history.

(56) References Cited

U.S. PATENT DOCUMENTS

| | | | |
|---|---|---|---|
| 4,268,822 | A | 5/1981 | Olsen |
| 5,361,184 | A | 11/1994 | El-Sharkawi et al. |
| 5,567,920 | A | 10/1996 | Watanabe et al. |
| 5,661,269 | A | 8/1997 | Fukuzaki et al. |

(Continued)

FOREIGN PATENT DOCUMENTS

| | | |
|---|---|---|
| CN | 105452884 A | 3/2016 |
| CN | 106471708 A | 3/2017 |

(Continued)

OTHER PUBLICATIONS

International Search Report and Written Opinion of the International Searching Authority, International Application No. PCT/US2019/045554, mailed Oct. 17, 2019.

(Continued)

*Primary Examiner* — William Lu
(74) *Attorney, Agent, or Firm* — Jackson Walker L.L.P.

(57) ABSTRACT

A method may include receiving an input signal, generating a baseline signal based on the input signal, generating a corrected input signal by subtracting the baseline signal from the input signal, determining a threshold level change of the input signal when the corrected input signal exceeds a level change threshold, and responsive to the threshold level change, updating the baseline signal to the level change threshold.

14 Claims, 12 Drawing Sheets

(56) References Cited

U.S. PATENT DOCUMENTS

| | | | |
|---|---|---|---|
| 5,715,529 A | 2/1998 | Kianush et al. | |
| 5,898,136 A | 4/1999 | Katsurahira | |
| 6,283,859 B1 | 9/2001 | Carlson et al. | |
| 6,380,923 B1 | 4/2002 | Fukumoto et al. | |
| 6,473,708 B1 | 10/2002 | Watkins et al. | |
| 7,173,410 B1 | 2/2007 | Pond | |
| 7,965,276 B1 | 6/2011 | Martin et al. | |
| 8,144,126 B2 | 3/2012 | Wright | |
| 8,174,352 B2 | 5/2012 | Parpia et al. | |
| 8,346,487 B2* | 1/2013 | Wright | G01N 30/8624 |
| | | | 702/32 |
| 8,421,446 B2 | 4/2013 | Straubinger et al. | |
| 8,428,889 B2 | 4/2013 | Wright | |
| 8,457,915 B2 | 6/2013 | White et al. | |
| 8,674,950 B2 | 3/2014 | Olson | |
| 8,970,230 B2 | 3/2015 | Narayanasamy et al. | |
| 9,070,856 B1 | 6/2015 | Rose et al. | |
| 9,164,605 B1* | 10/2015 | Pirogov | G06F 3/04144 |
| 10,128,836 B1* | 11/2018 | Buttolo | H03K 17/955 |
| 10,168,855 B2 | 1/2019 | Baughman et al. | |
| 10,372,328 B2 | 8/2019 | Zhai | |
| 10,571,307 B2 | 2/2020 | Acker | |
| 10,599,247 B2* | 3/2020 | Winokur | G06F 3/0447 |
| 10,624,691 B2 | 4/2020 | Wiender et al. | |
| 10,726,715 B2 | 7/2020 | Hwang et al. | |
| 10,795,518 B2* | 10/2020 | Kuan | G06F 3/0418 |
| 10,860,202 B2 | 12/2020 | Sepehr et al. | |
| 10,866,677 B2* | 12/2020 | Haraikawa | G06F 3/0421 |
| 10,908,200 B2 | 2/2021 | You et al. | |
| 10,921,159 B1 | 2/2021 | Das et al. | |
| 10,935,620 B2 | 3/2021 | Das et al. | |
| 10,942,610 B2 | 3/2021 | Maru et al. | |
| 10,948,313 B2 | 3/2021 | Kost et al. | |
| 11,079,874 B2 | 8/2021 | Lapointe et al. | |
| 11,092,657 B2 | 8/2021 | Maru et al. | |
| 11,093,060 B2 | 8/2021 | Yancey et al. | |
| 11,204,670 B2 | 12/2021 | Maru et al. | |
| 11,294,503 B2* | 4/2022 | Westerman | G06V 10/421 |
| 11,474,135 B2 | 10/2022 | Maru et al. | |
| 11,507,199 B2 | 11/2022 | Melanson | |
| 11,537,242 B2 | 12/2022 | Das et al. | |
| 11,579,030 B2* | 2/2023 | Li | G06F 3/016 |
| 11,644,370 B2 | 5/2023 | Marchais et al. | |
| 2001/0045941 A1 | 11/2001 | Rosenberg et al. | |
| 2005/0192727 A1 | 9/2005 | Shostak et al. | |
| 2005/0283330 A1 | 12/2005 | Laraia et al. | |
| 2006/0025897 A1 | 2/2006 | Shostak et al. | |
| 2006/0293864 A1 | 12/2006 | Soss | |
| 2007/0047634 A1 | 3/2007 | Kang et al. | |
| 2007/0080680 A1 | 4/2007 | Schroeder et al. | |
| 2007/0268265 A1 | 11/2007 | XiaoPing | |
| 2007/0296593 A1 | 12/2007 | Hall et al. | |
| 2007/0296709 A1 | 12/2007 | GuangHai | |
| 2008/0007534 A1 | 1/2008 | Peng et al. | |
| 2008/0024456 A1 | 1/2008 | Peng et al. | |
| 2008/0088594 A1 | 4/2008 | Liu et al. | |
| 2008/0088595 A1 | 4/2008 | Liu et al. | |
| 2008/0142352 A1 | 6/2008 | Wright | |
| 2008/0143681 A1 | 6/2008 | XiaoPing | |
| 2008/0158185 A1* | 7/2008 | Westerman | G06F 3/04166 |
| | | | 345/173 |
| 2009/0008161 A1* | 1/2009 | Jones | G06F 3/0445 |
| | | | 178/18.06 |
| 2009/0140728 A1 | 6/2009 | Rollins et al. | |
| 2009/0251216 A1 | 10/2009 | Giotta et al. | |
| 2009/0278685 A1 | 11/2009 | Potyrailo et al. | |
| 2009/0302868 A1 | 12/2009 | Feucht et al. | |
| 2009/0308155 A1 | 12/2009 | Zhang | |
| 2010/0019777 A1 | 1/2010 | Balslink | |
| 2010/0045360 A1 | 2/2010 | Howard et al. | |
| 2010/0114505 A1* | 5/2010 | Wang | G01N 3/00 |
| | | | 702/42 |
| 2010/0153845 A1 | 6/2010 | Gregorio et al. | |
| 2010/0211902 A1 | 8/2010 | Unsworth et al. | |
| 2011/0214481 A1 | 9/2011 | Kachanov et al. | |
| 2011/0267302 A1 | 11/2011 | Fasshauer | |
| 2011/0285667 A1 | 11/2011 | Poupyrev et al. | |
| 2012/0050206 A1* | 3/2012 | Welland | G06F 3/04182 |
| | | | 345/174 |
| 2013/0018489 A1* | 1/2013 | Grunthaner | H03K 17/9625 |
| | | | 324/686 |
| 2013/0076374 A1 | 3/2013 | Huang | |
| 2013/0269446 A1 | 10/2013 | Fukushima et al. | |
| 2014/0002113 A1 | 1/2014 | Schediwy et al. | |
| 2014/0137585 A1 | 5/2014 | Lu et al. | |
| 2014/0180042 A1* | 6/2014 | Addison | A61B 5/7221 |
| | | | 600/324 |
| 2014/0253107 A1 | 9/2014 | Roach et al. | |
| 2014/0278173 A1* | 9/2014 | Elia | G06F 3/0447 |
| | | | 702/65 |
| 2015/0027139 A1 | 1/2015 | Lin et al. | |
| 2015/0077094 A1 | 3/2015 | Baldwin et al. | |
| 2015/0084874 A1 | 3/2015 | Cheng et al. | |
| 2015/0109243 A1 | 4/2015 | Jun et al. | |
| 2015/0293695 A1 | 10/2015 | Schonleben et al. | |
| 2015/0355043 A1 | 12/2015 | Steeneken et al. | |
| 2016/0018940 A1 | 1/2016 | Lo et al. | |
| 2016/0117084 A1 | 4/2016 | Ording | |
| 2016/0162031 A1 | 6/2016 | Westerman et al. | |
| 2016/0169717 A1 | 6/2016 | Zhitomirsky | |
| 2016/0179243 A1 | 6/2016 | Schwartz | |
| 2016/0231860 A1* | 8/2016 | Elia | G06F 3/0418 |
| 2016/0231874 A1 | 8/2016 | Baughman et al. | |
| 2016/0241227 A1 | 8/2016 | Hirata | |
| 2016/0357296 A1 | 12/2016 | Picciotto et al. | |
| 2017/0077735 A1 | 3/2017 | Leabman | |
| 2017/0093222 A1 | 3/2017 | Joye et al. | |
| 2017/0097437 A1 | 4/2017 | Widmer et al. | |
| 2017/0140644 A1 | 5/2017 | Hwang et al. | |
| 2017/0169674 A1 | 6/2017 | Macours | |
| 2017/0184416 A1 | 6/2017 | Kohlenberg et al. | |
| 2017/0185173 A1 | 6/2017 | Ito et al. | |
| 2017/0237293 A1 | 8/2017 | Faraone et al. | |
| 2017/0242505 A1* | 8/2017 | Vandermeijden | G01K 3/14 |
| 2017/0282715 A1 | 10/2017 | Fung et al. | |
| 2017/0315653 A1 | 11/2017 | Vandermeijden et al. | |
| 2017/0322643 A1 | 11/2017 | Eguchi | |
| 2017/0328740 A1 | 11/2017 | Widmer et al. | |
| 2017/0371380 A1 | 12/2017 | Oberhauser et al. | |
| 2017/0371381 A1 | 12/2017 | Liu | |
| 2017/0371473 A1 | 12/2017 | David et al. | |
| 2018/0020288 A1 | 1/2018 | Risbo et al. | |
| 2018/0039331 A1 | 2/2018 | Warren | |
| 2018/0059793 A1 | 3/2018 | Hajati | |
| 2018/0067601 A1* | 3/2018 | Winokur | G06F 3/0447 |
| 2018/0088702 A1* | 3/2018 | Shutzberg | G06F 1/1656 |
| 2018/0097475 A1 | 4/2018 | Djahanshahi et al. | |
| 2018/0135409 A1 | 5/2018 | Wilson et al. | |
| 2018/0189647 A1 | 7/2018 | Calvo et al. | |
| 2018/0195881 A1 | 7/2018 | Acker | |
| 2018/0294757 A1 | 10/2018 | Feng et al. | |
| 2018/0321748 A1 | 11/2018 | Rao et al. | |
| 2018/0341363 A1* | 11/2018 | Wang | G06F 3/0418 |
| 2018/0364731 A1 | 12/2018 | Liu et al. | |
| 2019/0052045 A1 | 2/2019 | Metzger et al. | |
| 2019/0179146 A1 | 6/2019 | De Nardi | |
| 2019/0197218 A1 | 6/2019 | Schwartz | |
| 2019/0204929 A1 | 7/2019 | Attari et al. | |
| 2019/0286263 A1* | 9/2019 | Bagheri | G06F 3/0414 |
| 2019/0302161 A1 | 10/2019 | You et al. | |
| 2019/0302193 A1 | 10/2019 | Maru et al. | |
| 2019/0302890 A1 | 10/2019 | Marijanovic et al. | |
| 2019/0302922 A1 | 10/2019 | Das et al. | |
| 2019/0302923 A1 | 10/2019 | Maru et al. | |
| 2019/0326906 A1 | 10/2019 | Camacho Cardenas et al. | |
| 2019/0339313 A1* | 11/2019 | Vandermeijden | G06F 3/0414 |
| 2019/0377468 A1 | 12/2019 | Micci et al. | |
| 2020/0064160 A1 | 2/2020 | Maru et al. | |
| 2020/0064952 A1* | 2/2020 | Gupta | G06F 3/0414 |
| 2020/0101286 A1* | 4/2020 | Windmiller | A61B 5/1468 |
| 2020/0320966 A1 | 10/2020 | Clark et al. | |
| 2020/0373923 A1 | 11/2020 | Walsh et al. | |
| 2020/0382113 A1 | 12/2020 | Beardsworth et al. | |
| 2020/0386804 A1 | 12/2020 | Das et al. | |

(56) References Cited

U.S. PATENT DOCUMENTS

| | | | |
|---|---|---|---|
| 2021/0064137 A1 | 3/2021 | Wopat et al. | |
| 2021/0140797 A1 | 5/2021 | Kost et al. | |
| 2021/0149538 A1 | 5/2021 | LaPointe et al. | |
| 2021/0152174 A1 | 5/2021 | Yancey et al. | |
| 2021/0361940 A1 | 11/2021 | Yeh et al. | |
| 2021/0396610 A1 | 12/2021 | Li et al. | |
| 2021/0404901 A1 | 12/2021 | Kost et al. | |
| 2021/0405764 A1 | 12/2021 | Hellman et al. | |
| 2022/0075500 A1 | 3/2022 | Chang et al. | |
| 2022/0268233 A1 | 8/2022 | Kennedy et al. | |
| 2022/0307867 A1* | 9/2022 | Das | G01D 5/202 |
| 2022/0308000 A1 | 9/2022 | Das et al. | |
| 2022/0404409 A1 | 12/2022 | Maru et al. | |

FOREIGN PATENT DOCUMENTS

| | | | |
|---|---|---|---|
| CN | 107076623 A | 8/2017 | |
| CN | 209069345 U | 7/2019 | |
| CN | 110609610 A | 12/2019 | |
| DE | 4004450 A1 | 8/1991 | |
| DE | 602004005672 T2 | 12/2007 | |
| DE | 102015215330 A1 | 2/2017 | |
| DE | 102015215331 A1 | 2/2017 | |
| EP | 1697710 B1 | 4/2007 | |
| EP | 2682843 A1 | 1/2014 | |
| GB | 2394295 A | 4/2004 | |
| GB | 2573644 A | 11/2019 | |
| GB | 2582065 A | 9/2020 | |
| GB | 2582864 A | 10/2020 | |
| GB | 2586722 B | 2/2022 | |
| JP | 2006246289 A | 9/2006 | |
| KR | 20130052059 A | 5/2013 | |
| WO | 00/33244 A2 | 6/2000 | |
| WO | 20061354832 A2 | 12/2006 | |
| WO | 2007068283 A1 | 6/2007 | |
| WO | 2016032704 A1 | 3/2016 | |
| WO | 2021101722 A1 | 5/2021 | |
| WO | 2021101723 A1 | 5/2021 | |

OTHER PUBLICATIONS

Combined Search and Examination Report, UKIPO, Application No. GB1904250.6, mailed Sep. 10, 2019.
International Search Report and Written Opinion of the International Searching Authority, International Application No. PCT/US2019/022518, mailed May 24, 2019.
International Search Report and Written Opinion of the International Searching Authority, International Application No. PCT/US2019/022578, mailed May 27, 2019.
International Search Report and Written Opinion of the International Searching Authority, International Application No. PCT/US2019/021838, mailed May 27, 2019.
International Search Report and Written Opinion of the International Searching Authority, International Application No. PCT/US2020/059113, mailed Feb. 23, 2021.
International Search Report and Written Opinion of the International Searching Authority, International Application No. PCT/US2020/059101, mailed Mar. 9, 2021.
Office Action, CNIPA, Application No. 201980022689.9, mailed Jun. 2, 2021.
International Search Report and Written Opinion of the International Searching Authority, International Application No. PCT/US2021/035695, mailed September 9, 20201.
Second Office Action, China National Intellectual Property Administration, Application No. 201980022689.9, mailed Oct. 27, 2021.
Second Office Action, China National Intellectual Property Administration, Application No. 201980022693.5, mailed Dec. 14, 2021.
Combined Search and Examination Report under Sections 17 and 18(3), UKIPO, Application No. GB2111666.0, mailed Feb. 11, 2022.
Combined Search and Examination Report under Sections 17 and 18(3), UKIPO, Application No. GB2001341.3, mailed Jun. 29, 2020.
First Office Action, China National Intellectual Property Administration, Application No. 201980022689.9, issued Jun. 2, 2021.
First Office Action, China National Intellectual Property Administration, Application No. 201980022693.5, issued Jul. 8, 2021.
International Search Report and Written Opinion of the International Searching Authority, International Application No. PCT/US2022/012721, mailed Apr. 26, 2022.
Second Office Action, China National Intellectual Property Administration, Application No. 201980022693.5, issued Apr. 13, 2022.
Examination Report under Section 18(3), UKIPO, Application No. GB2015439.9, mailed May 10, 2022.
Examination Report under Section 18(3), UKIPO, Application No. GB2101804.9, mailed Feb. 25, 2022.
International Search Report and Written Opinion of the International Searching Authority, International Application No. PCT/US2022/018886, mailed Jun. 10, 2022.
Combined Search and Examination Report under Sections 17 and 18(3), UKIPO, Application No. GB2201194.4, mailed Jul. 1, 2022.
International Search Report and Written Opinion of the International Searching Authority, International Application No. PCT/US2022/018475, mailed Aug. 2, 2022.
First Office Action, China National Intellectual Property Administration, Application No. 202010105829.3, issued Apr. 12, 2022.
Notice of Preliminary Rejection, Korean Intellectual Property Office, Application No. 10-2020-7029597, mailed Jul. 29, 2022.
Second Office Action, China National Intellectual Property Administration, Application No. 201980054799.3, issued May 24, 2023.
Combined Search and Examination Report under Sections 17 and 18(3), United Kingdom Intellectual Property Office, Application No. GB2215005.6, mailed Apr. 11, 2023.
First Office Action, China National Intellectual Property Administration, Application No. 202080080853.4, issued Feb. 22, 2023.
Gao, Shuo, et al., Piezoelectric vs. Capactivie Based Force Sensing in Capacitive Touch Panels, IEEE Access, vol. 4, Jul. 14, 2016.
First Office Action, China Intellectual Property Administration, Application No. 202180043659.3, issued Sep. 8, 2023.
Combined Search and Examination Report, United Kingdom Intellectual Property Office, Application No. GB2313599.9, mailed Oct. 9, 2023.

* cited by examiner

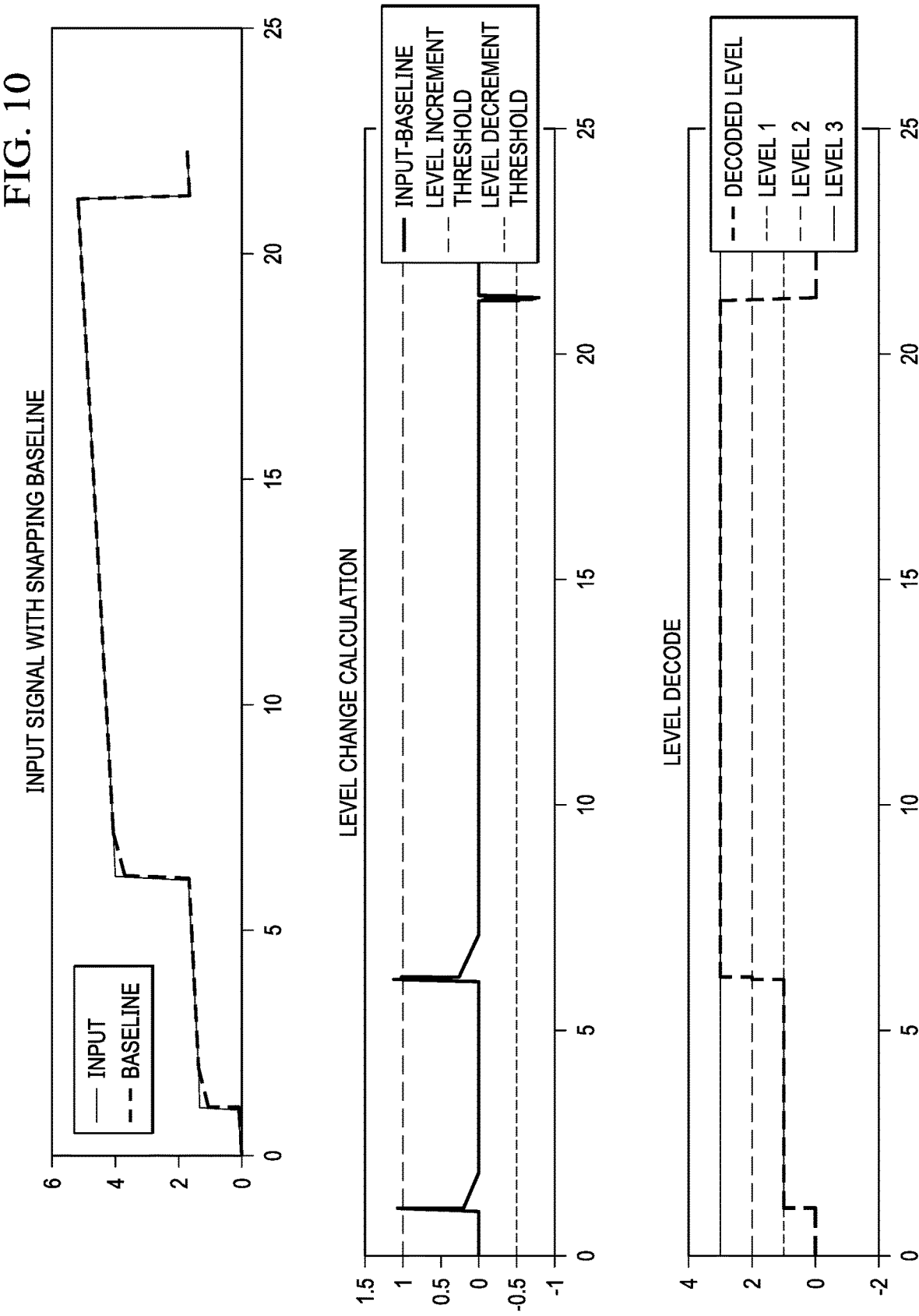

BASELINE CALCULATION FOR SENSOR SYSTEM

RELATED APPLICATIONS

The present disclosure claims priority to U.S. Provisional Patent Application Ser. No. 62/937,528, filed Nov. 19, 2019, which is incorporated by reference herein in its entirety. The present disclosure also relates to U.S. patent application Ser. No. 16/267,079, filed Feb. 4, 2019, and U.S. patent application Ser. No. 16/422,543, filed May 24, 2019, both of which are incorporated by reference herein in their entireties.

FIELD OF DISCLOSURE

The present disclosure relates in general to electronic devices with user interfaces, (e.g., mobile devices, game controllers, instrument panels, etc.), and more particularly, an integrated haptic system for use in a system for mechanical button replacement in a mobile device, for use in haptic feedback for capacitive sensors, and/or other suitable applications.

BACKGROUND

Many traditional mobile devices (e.g., mobile phones, personal digital assistants, video game controllers, etc.) include mechanical buttons to allow for interaction between a user of a mobile device and the mobile device itself. However, such mechanical buttons are susceptible to aging, wear, and tear that may reduce the useful life of a mobile device and/or may require significant repair if malfunction occurs. Also, the presence of mechanical buttons may render it difficult to manufacture mobile devices to be waterproof. Accordingly, mobile device manufacturers are increasingly looking to equip mobile devices with virtual buttons that act as a human-machine interface allowing for interaction between a user of a mobile device and the mobile device itself. Similarly, mobile device manufacturers are increasingly looking to equip mobile devices with other virtual interface areas (e.g., a virtual slider, interface areas of a body of the mobile device other than a touch screen, etc.). Ideally, for best user experience, such virtual interface areas should look and feel to a user as if a mechanical button or other mechanical interface were present instead of a virtual button or virtual interface area.

Presently, linear resonant actuators (LRAs) and other vibrational actuators (e.g., rotational actuators, vibrating motors, etc.) are increasingly being used in mobile devices to generate vibrational feedback in response to user interaction with human-machine interfaces of such devices. Typically, a sensor (traditionally a force or pressure sensor) detects user interaction with the device (e.g., a finger press on a virtual button of the device) and in response thereto, the linear resonant actuator may vibrate to provide feedback to the user. For example, a linear resonant actuator may vibrate in response to user interaction with the human-machine interface to mimic to the user the feel of a mechanical button click.

However, there is a need in the industry for sensors to detect user interaction with a human-machine interface, wherein such sensors provide acceptable levels of sensor sensitivity, power consumption, and size. For example, one challenge in the implementation of a virtual button is the accurate discrimination between actual user interaction with the virtual button and anomalous sensor inputs such as those caused by force sensor drift (e.g., due to aging and temperature) and/or device bending.

SUMMARY

In accordance with the teachings of the present disclosure, the disadvantages and problems associated with use of a virtual button in a mobile device may be reduced or eliminated.

In accordance with embodiments of the present disclosure, a method may include receiving an input signal, generating a baseline signal based on the input signal, generating a corrected input signal by subtracting the baseline signal from the input signal, determining a threshold level change of the input signal when the corrected input signal exceeds a level change threshold, and responsive to the threshold level change, updating the baseline signal to the level change threshold.

In accordance with these and other embodiments of the present disclosure, a method may include receiving an input signal, generating a baseline signal based on the input signal, and generating a corrected input signal based on variation of a temperature by determining a difference between the input signal and the baseline signal, responsive to the difference being positive and greater in magnitude than a nominal tracking rate, updating the baseline signal by adding the nominal tracking rate to the baseline signal, and responsive to the difference being negative and greater in magnitude than the nominal tracking rate, updating the baseline signal by subtracting the nominal tracking rate from the baseline signal.

In accordance with these and other embodiments of the present disclosure, a system may include an input for receiving an input signal, an output for generating a baseline signal based on the input signal, and a baseline calculation engine configured to generate a corrected input signal by subtracting the baseline signal from the input signal, determine a threshold level change of the input signal when the corrected input signal exceeds a level change threshold, and responsive to the threshold level change, update the baseline signal to the level change threshold.

In accordance with these and other embodiments of the present disclosure, a system may include an input for receiving an input signal, an output for generating a baseline signal based on the input signal, and a baseline calculation engine configured to generate a corrected input signal based on variation of a temperature by determining a difference between the input signal and the baseline signal, responsive to the difference being positive and greater in magnitude than a nominal tracking rate, updating the baseline signal by adding the nominal tracking rate to the baseline signal, and responsive to the difference being negative and greater in magnitude than the nominal tracking rate, updating the baseline signal by subtracting the nominal tracking rate from the baseline signal.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 10 illustrates example waveforms depicting of example operation of the baseline calculation engine shown in FIG. 9, in accordance with embodiments of the present disclosure;

DETAILED DESCRIPTION

Figure 1:
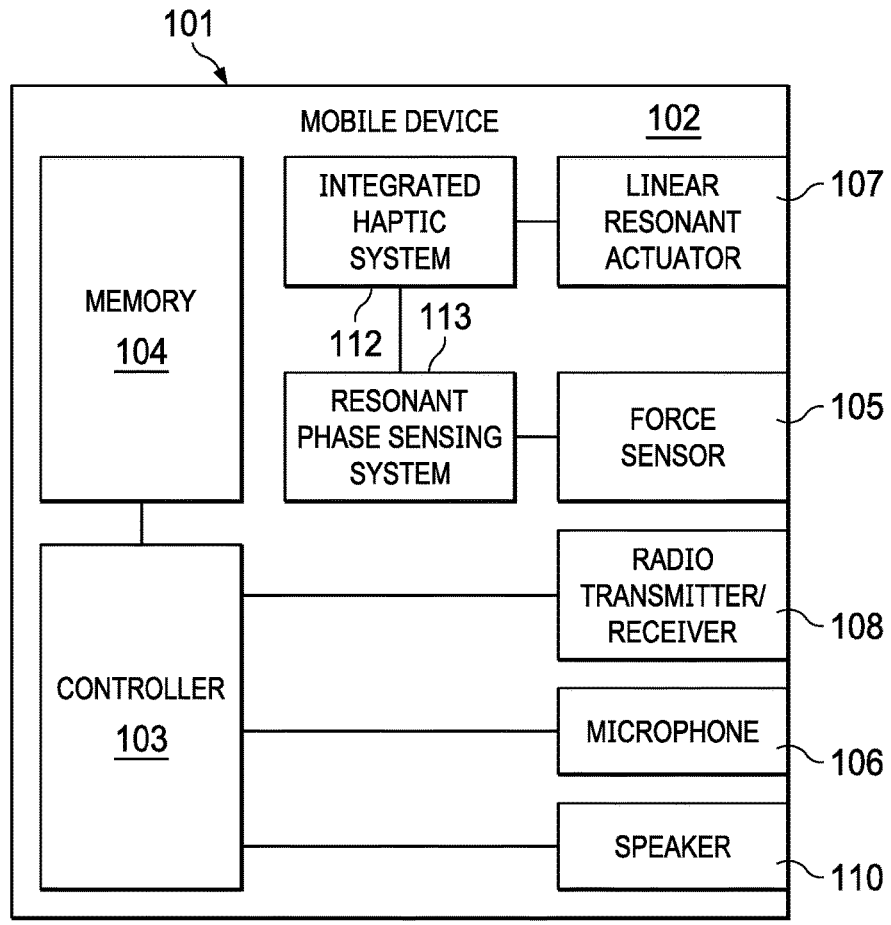
FIG. 1 illustrates a block diagram of selected components of an example mobile device, in accordance with embodiments of the present disclosure.

FIG. 1 illustrates a block diagram of selected components of an example mobile device 102, in accordance with embodiments of the present disclosure. As shown in FIG. 1, mobile device 102 may comprise an enclosure 101, a controller 103, a memory 104, a force sensor 105, a microphone 106, a linear resonant actuator 107, a radio transmitter/receiver 108, a speaker 110, an integrated haptic system 112, and a resonant phase sensing system 113.

Enclosure 101 may comprise any suitable housing, casing, or other enclosure for housing the various components of mobile device 102. Enclosure 101 may be constructed from plastic, metal, and/or any other suitable materials. In addition, enclosure 101 may be adapted (e.g., sized and shaped) such that mobile device 102 is readily transported on a person of a user of mobile device 102. Accordingly, mobile device 102 may include but is not limited to a smart phone, a tablet computing device, a handheld computing device, a personal digital assistant, a notebook computer, a video game controller, or any other device that may be readily transported on a person of a user of mobile device 102.

Controller 103 may be housed within enclosure 101 and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, controller 103 interprets and/or executes program instructions and/or processes data stored in memory 104 and/or other computer-readable media accessible to controller 103.

Memory 104 may be housed within enclosure 101, may be communicatively coupled to controller 103, and may include any system, device, or apparatus configured to retain program instructions and/or data for a period of time (e.g., computer-readable media). Memory 104 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

Microphone 106 may be housed at least partially within enclosure 101, may be communicatively coupled to controller 103, and may comprise any system, device, or apparatus configured to convert sound incident at microphone 106 to an electrical signal that may be processed by controller 103, wherein such sound is converted to an electrical signal using a diaphragm or membrane having an electrical capacitance that varies as based on sonic vibrations received at the diaphragm or membrane. Microphone 106 may include an electrostatic microphone, a condenser microphone, an electret microphone, a microelectromechanical systems (MEMs) microphone, or any other suitable capacitive microphone.

Radio transmitter/receiver 108 may be housed within enclosure 101, may be communicatively coupled to controller 103, and may include any system, device, or apparatus configured to, with the aid of an antenna, generate and transmit radio-frequency signals as well as receive radio-frequency signals and convert the information carried by such received signals into a form usable by controller 103. Radio transmitter/receiver 108 may be configured to transmit and/or receive various types of radio-frequency signals, including without limitation, cellular communications (e.g., 2G, 3G, 4G, LTE, etc.), short-range wireless communications (e.g., BLUETOOTH), commercial radio signals, television signals, satellite radio signals (e.g., GPS), Wireless Fidelity, etc.

A speaker 110 may be housed at least partially within enclosure 101 or may be external to enclosure 101, may be communicatively coupled to controller 103, and may comprise any system, device, or apparatus configured to produce sound in response to electrical audio signal input. In some embodiments, a speaker may comprise a dynamic loudspeaker, which employs a lightweight diaphragm mechanically coupled to a rigid frame via a flexible suspension that constrains a voice coil to move axially through a cylindrical magnetic gap. When an electrical signal is applied to the voice coil, a magnetic field is created by the electric current in the voice coil, making it a variable electromagnet. The coil and the driver's magnetic system interact, generating a mechanical force that causes the coil (and thus, the attached cone) to move back and forth, thereby reproducing sound under the control of the applied electrical signal coming from the amplifier.

Force sensor 105 may be housed within enclosure 101, and may include any suitable system, device, or apparatus for sensing a force, a pressure, or a touch (e.g., an interaction with a human finger) and generating an electrical or electronic signal in response to such force, pressure, or touch. In some embodiments, such electrical or electronic signal may be a function of a magnitude of the force, pressure, or touch applied to the force sensor. In these and other embodiments, such electronic or electrical signal may comprise a general purpose input/output signal (GPIO) associated with an input signal to which haptic feedback is given. Force sensor 105 may include, without limitation, a capacitive displacement sensor, an inductive force sensor (e.g., a resistive-inductive-capacitive sensor), a strain gauge, a piezoelectric force sensor, force sensing resistor, piezoelectric force sensor, thin film force sensor, or a quantum tunneling composite-based force sensor. For purposes of clarity and exposition in this disclosure, the term "force" as used herein may refer not only to force, but to physical quantities indicative of force or analogous to force, such as, but not limited to, pressure and touch.

Linear resonant actuator 107 may be housed within enclosure 101, and may include any suitable system, device, or apparatus for producing an oscillating mechanical force across a single axis. For example, in some embodiments, linear resonant actuator 107 may rely on an alternating current voltage to drive a voice coil pressed against a moving mass connected to a spring. When the voice coil is driven at the resonant frequency of the spring, linear resonant actuator 107 may vibrate with a perceptible force. Thus, linear resonant actuator 107 may be useful in haptic applications within a specific frequency range. While, for the purposes of clarity and exposition, this disclosure is described in relation to the use of linear resonant actuator 107, it is understood that any other type or types of vibrational actuators (e.g., eccentric rotating mass actuators) may be used in lieu of or in addition to linear resonant actuator 107. In addition, it is also understood that actuators arranged to produce an oscillating mechanical force across multiple axes may be used in lieu of or in addition to linear resonant actuator 107. As described elsewhere in this disclosure, a linear resonant actuator 107, based on a signal received from integrated haptic system 112, may render haptic feedback to a user of mobile device 102 for at least one of mechanical button replacement and capacitive sensor feedback.

Integrated haptic system 112 may be housed within enclosure 101, may be communicatively coupled to force sensor 105 and linear resonant actuator 107, and may include any system, device, or apparatus configured to receive a signal from force sensor 105 indicative of a force applied to mobile device 102 (e.g., a force applied by a human finger to a virtual button of mobile device 102) and generate an electronic signal for driving linear resonant actuator 107 in response to the force applied to mobile device 102. Detail of an example integrated haptic system in accordance with embodiments of the present disclosure is depicted in FIG. 2.

Resonant phase sensing system 113 may be housed within enclosure 101, may be communicatively coupled to force sensor 105 and linear resonant actuator 107, and may include any system, device, or apparatus configured to detect a displacement of a mechanical member (e.g., mechanical member 305 depicted in FIGS. 3A and 3B, below) indicative of a physical interaction (e.g., by a user of mobile device 102) with the human-machine interface of mobile device 102 (e.g., a force applied by a human finger to a virtual interface of mobile device 102). As described in greater detail below, resonant phase sensing system 113 may detect displacement of such mechanical member by performing resonant phase sensing of a resistive-inductive-capacitive sensor for which an impedance (e.g., inductance, capacitance, and/or resistance) of the resistive-inductive-capacitive sensor changes in response to displacement of the mechanical member. Thus, displacement of the mechanical member may cause a change in an impedance of a resistive-inductive-capacitive sensor integral to resonant phase sense system 113. Resonant phase sensing system 113 may also generate an electronic signal to integrated haptic system 112 to which integrated haptic system 112 may respond by driving linear resonant actuator 107 in response to a physical interaction associated with a human-machine interface associated with the mechanical member. Detail of an example resonant phase sensing system 113 in accordance with embodiments of the present disclosure is depicted in greater detail below.

Although specific example components are depicted above in FIG. 1 as being integral to mobile device 102 (e.g., controller 103, memory 104, force sensor 105, microphone 106, radio transmitter/receiver 108, speakers(s) 110), a mobile device 102 in accordance with this disclosure may comprise one or more components not specifically enumerated above. For example, although FIG. 1 depicts certain user interface components, mobile device 102 may include one or more other user interface components in addition to those depicted in FIG. 1 (including but not limited to a keypad, a touch screen, and a display), thus allowing a user to interact with and/or otherwise manipulate mobile device 102 and its associated components.

Figure 2:
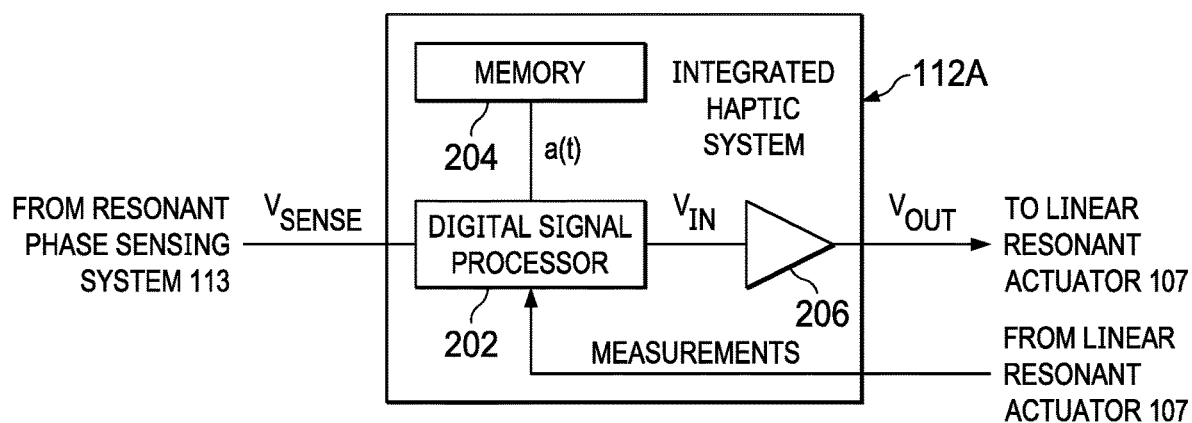
FIG. 2 illustrates a block diagram of selected components of an example integrated haptic system, in accordance with embodiments of the present disclosure.

FIG. 2 illustrates a block diagram of selected components of an example integrated haptic system 112A, in accordance with embodiments of the present disclosure. In some embodiments, integrated haptic system 112A may be used to implement integrated haptic system 112 of FIG. 1. As shown in FIG. 2, integrated haptic system 112A may include a digital signal processor (DSP) 202, a memory 204, and an amplifier 206.

DSP 202 may include any system, device, or apparatus configured to interpret and/or execute program instructions and/or process data. In some embodiments, DSP 202 may interpret and/or execute program instructions and/or process data stored in memory 204 and/or other computer-readable media accessible to DSP 202.

Memory 204 may be communicatively coupled to DSP 202, and may include any system, device, or apparatus configured to retain program instructions and/or data for a period of time (e.g., computer-readable media). Memory 204 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

Amplifier 206 may be electrically coupled to DSP 202 and may comprise any suitable electronic system, device, or apparatus configured to increase the power of an input signal $V_{IN}$ (e.g., a time-varying voltage or current) to generate an output signal $V_{OUT}$. For example, amplifier 206 may use electric power from a power supply (not explicitly shown) to increase the amplitude of a signal. Amplifier 206 may include any suitable amplifier class, including without limitation, a Class-D amplifier.

In operation, memory 204 may store one or more haptic playback waveforms. In some embodiments, each of the one or more haptic playback waveforms may define a haptic response a(t) as a desired acceleration of a linear resonant actuator (e.g., linear resonant actuator 107) as a function of time. DSP 202 may be configured to receive a force signal $V_{SENSE}$ from resonant phase sensing system 113 indicative of force applied to force sensor 105. Either in response to receipt of force signal $V_{SENSE}$ indicating a sensed force or independently of such receipt, DSP 202 may retrieve a haptic playback waveform from memory 204 and process such haptic playback waveform to determine a processed haptic playback signal $V_{IN}$. In embodiments in which amplifier 206 is a Class D amplifier, processed haptic playback signal $V_{IN}$ may comprise a pulse-width modulated signal. In response to receipt of force signal $V_{SENSE}$ indicating a sensed force, DSP 202 may cause processed haptic playback signal $V_{IN}$ to be output to amplifier 206, and amplifier 206 may amplify processed haptic playback signal $V_{IN}$ to generate a haptic output signal $V_{OUT}$ for driving linear resonant actuator 107.

In some embodiments, integrated haptic system 112A may be formed on a single integrated circuit, thus enabling lower latency than existing approaches to haptic feedback control. By providing integrated haptic system 112A as part of a single monolithic integrated circuit, latencies between various interfaces and system components of integrated haptic system 112A may be reduced or eliminated.

Figure 3A:
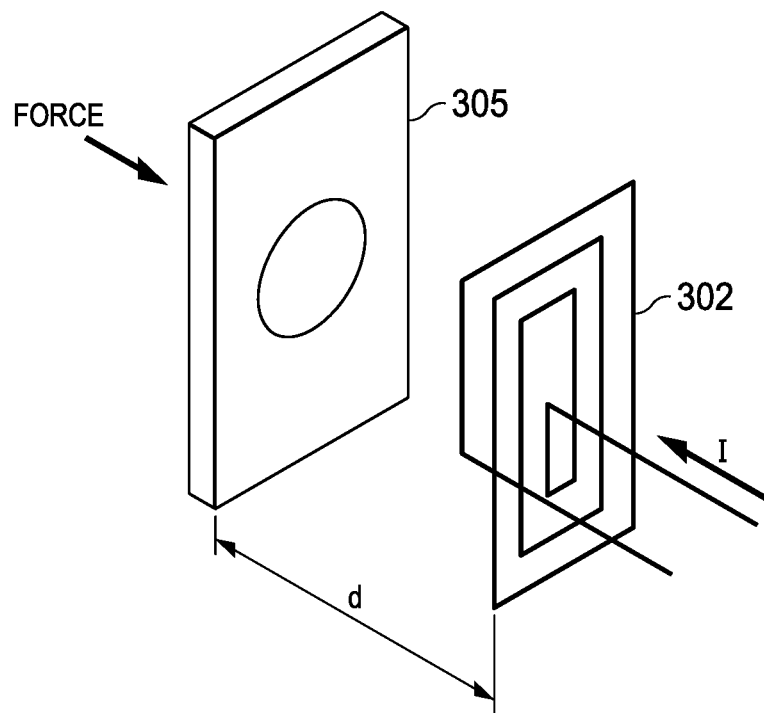
FIG. 3A illustrates a mechanical member separated by a distance from an inductive coil, in accordance with embodiments of the present disclosure.

FIG. 3A illustrates a mechanical member 305 embodied as a metal plate separated by a distance d from an inductive coil 302, in accordance with embodiments of the present disclosure. Mechanical member 305 may comprise any suitable system, device, or apparatus which all or a portion thereof may displace, wherein such displacement affects an electrical property (e.g., inductance, capacitance, etc.) of the mechanical member 305 or another electrical component in electrical communication (e.g., via a mutual inductance) with mechanical member 305.

Figure 3B:
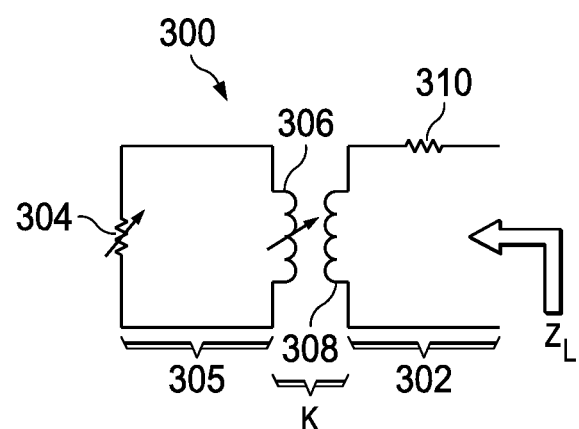
FIG. 3B illustrates selected components of an inductive sensing system that may be implemented by a resonant phase sensing system, in accordance with embodiments of the present disclosure.

FIG. 3B illustrates selected components of an inductive sensing system 300 that may be implemented by force sensor 105 and/or resonant phase sensing system 113, in accordance with embodiments of the present disclosure. As shown in FIG. 3, inductive sensing system 300 may include mechanical member 305, modeled as a variable electrical resistance 304 and a variable electrical inductance 306, and may include inductive coil 302 in physical proximity to mechanical member 305 such that inductive coil 302 has a mutual inductance with mechanical member 305 defined by a variable coupling coefficient k. As shown in FIG. 3, inductive coil 302 may be modeled as a variable electrical inductance 308 and a variable electrical resistance 310.

In operation, as a current I flows through inductive coil 302, such current may induce a magnetic field which in turn may induce an eddy current inside mechanical member 305. When a force is applied to and/or removed from mechanical member 305, which alters distance d between mechanical member 305 and inductive coil 302, the coupling coefficient k, variable electrical resistance 304, and/or variable electrical inductance 306 may also change in response to the change in distance. These changes in the various electrical parameters may, in turn, modify an effective impedance $Z_L$ of inductive coil 302.

Figure 4:
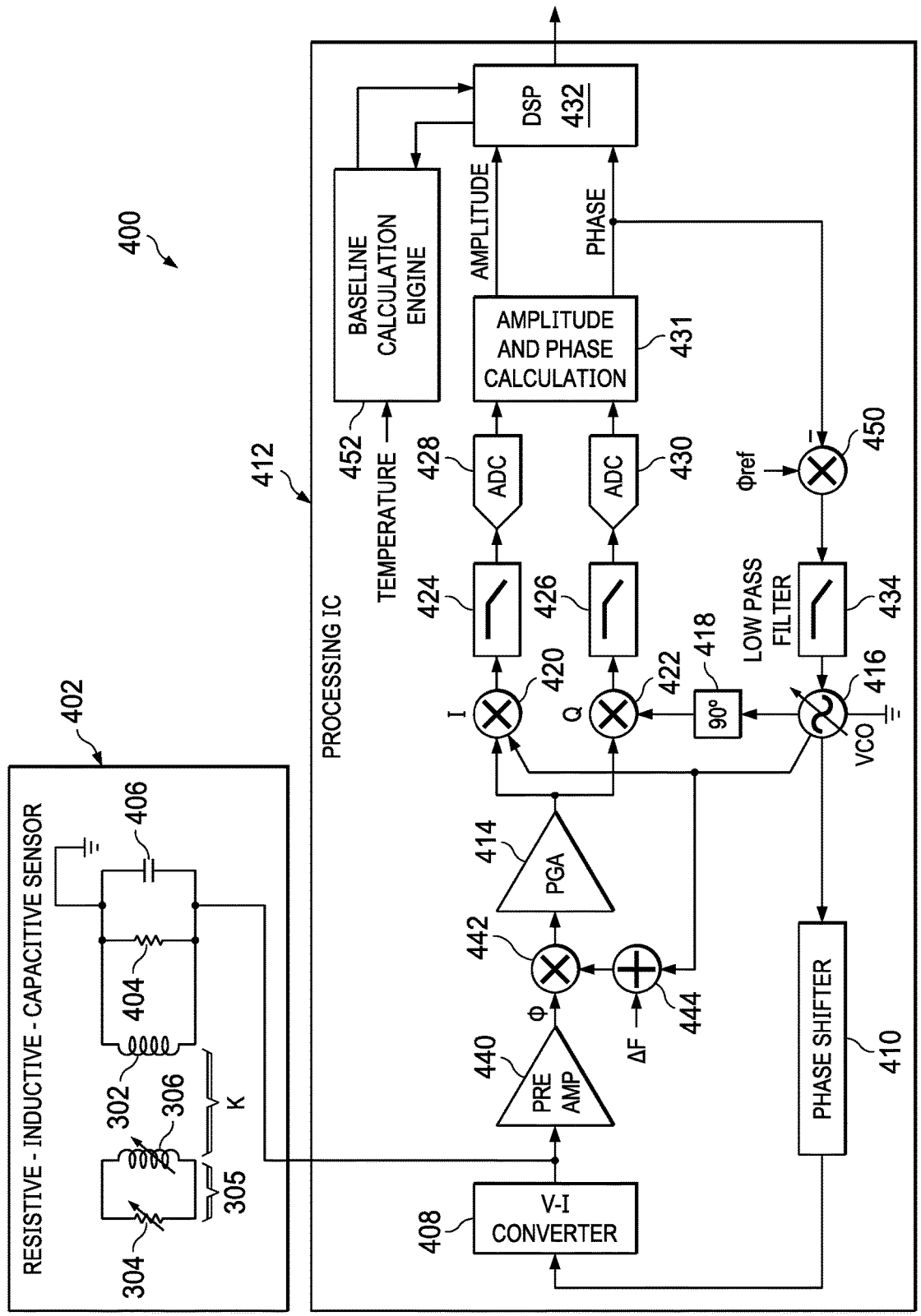
FIG. 4 illustrates a diagram of selected components of an example system for performing resonant phase sensing, in accordance with embodiments of the present disclosure.

FIG. 4 illustrates a diagram of selected components of an example system 400 for performing resonant phase sensing, in accordance with embodiments of the present disclosure. In some embodiments, system 400 may be used to implement resonant phase sensing system 113 of FIG. 1. As shown FIG. 4, system 400 may include a resistive-inductive-capacitive sensor 402 and a processing integrated circuit (IC) 412. In some embodiments, resistive-inductive-capacitive sensor 402 may implement all or a portion of force sensor 105 and processing integrated circuit (IC) 412 may implement all or a portion of resonant phase sensing system 113.

As shown in FIG. 4, resistive-inductive-capacitive sensor 402 may include mechanical member 305, inductive coil 302, a resistor 404, and capacitor 406, wherein mechanical member 305 and inductive coil 302 have a variable coupling coefficient k. Although shown in FIG. 4 to be arranged in parallel with one another, it is understood that inductive coil 302, resistor 404, and capacitor 406 may be arranged in any other suitable manner that allows resistive-inductive-capacitive sensor 402 to act as a resonant tank. For example, in some embodiments, inductive coil 302, resistor 404, and capacitor 406 may be arranged in series with one another. In some embodiments, resistor 404 may not be implemented with a stand-alone resistor, but may instead be implemented by a parasitic resistance of inductive coil 302, a parasitic resistance of capacitor 406, and/or any other suitable parasitic resistance.

Processing IC 412 may be communicatively coupled to resistive-inductive-capacitive sensor 402 and may comprise any suitable system, device, or apparatus configured to implement a measurement circuit to measure phase information associated with resistive-inductive-capacitive sensor 402 and based on the phase information, determine a displacement of mechanical member 305 relative to resistive-inductive-capacitive sensor 402. Thus, processing IC 412 may be configured to determine an occurrence of a physical interaction (e.g., press or release of a virtual button) associated with a human-machine interface associated with mechanical member 305 based on the phase information.

As shown in FIG. 4, processing IC 412 may include a phase shifter 410, a voltage-to-current converter 408, a preamplifier 440, an intermediate frequency mixer 442, a combiner 444, a programmable gain amplifier (PGA) 414, a voltage-controlled oscillator (VCO) 416, a phase shifter 418, an amplitude and phase calculation block 431, a DSP 432, a low-pass filter 434, a combiner 450, and a baseline calculation engine 452. Processing IC 412 may also include a coherent incident/quadrature detector implemented with an incident channel comprising a mixer 420, a low-pass filter 424, and an analog-to-digital converter (ADC) 428, and a quadrature channel comprising a mixer 422, a low-pass filter 426, and an ADC 430 such that processing IC 412 is configured to measure the phase information using the coherent incident/quadrature detector.

Phase shifter 410 may include any system, device, or apparatus configured to detect an oscillation signal generated by processing IC 412 (as explained in greater detail below) and phase shift such oscillation signal (e.g., by 45 degrees) such that at a normal operating frequency of system 400, an incident component of a sensor signal $_4$ generated by pre-amplifier 440 is approximately equal to a quadrature component of sensor signal 4, so as to provide common mode noise rejection by a phase detector implemented by processing IC 412, as described in greater detail below.

Voltage-to-current converter 408 may receive the phase shifted oscillation signal from phase shifter 410, which may be a voltage signal, convert the voltage signal to a corresponding current signal, and drive the current signal on resistive-inductive-capacitive sensor 402 at a driving frequency with the phase-shifted oscillation signal in order to generate sensor signal $_4$ which may be processed by processing IC 412, as described in greater detail below. In some embodiments, a driving frequency of the phase-shifted oscillation signal may be selected based on a resonant frequency of resistive-inductive-capacitive sensor 402 (e.g., may be approximately equal to the resonant frequency of resistive-inductive-capacitive sensor 402).

Preamplifier 440 may receive sensor signal ϕ and condition sensor signal ϕ for frequency mixing, with mixer 442, to an intermediate frequency Δf combined by combiner 444 with an oscillation frequency generated by VCO 416, as described in greater detail below, wherein intermediate frequency Δf is significantly less than the oscillation frequency. In some embodiments, preamplifier 440, mixer 442, and combiner 444 may not be present, in which case PGA 414 may receive sensor signal ϕ directly from resistive-inductive-capacitive sensor 402. However, when present, preamplifier 440, mixer 442, and combiner 444 may allow for mixing sensor signal ϕ down to a lower intermediate frequency Δf which may allow for lower-bandwidth and more efficient ADCs and/or which may allow for minimization of phase and/or gain mismatches in the incident and quadrature paths of the phase detector of processing IC 412.

In operation, PGA 414 may further amplify sensor signal ϕ to condition sensor signal ϕ for processing by the coherent incident/quadrature detector. VCO 416 may generate an oscillation signal to be used as a basis for the signal driven by voltage-to-current converter 408, as well as the oscillation signals used by mixers 420 and 422 to extract incident and quadrature components of amplified sensor signal ϕ. As shown in FIG. 4, mixer 420 of the incident channel may use an unshifted version of the oscillation signal generated by VCO 416, while mixer 422 of the quadrature channel may use a 90-degree shifted version of the oscillation signal phase shifted by phase shifter 418. As mentioned above, the oscillation frequency of the oscillation signal generated by VCO 416 may be selected based on a resonant frequency of resistive-inductive-capacitive sensor 402 (e.g., may be approximately equal to the resonant frequency of resistive-inductive-capacitive sensor 402).

In the incident channel, mixer 420 may extract the incident component of amplified sensor signal ϕ, low-pass filter 424 may filter out the oscillation signal mixed with the amplified sensor signal ϕ to generate a direct current (DC) incident component, and ADC 428 may convert such DC incident component into an equivalent incident component digital signal for processing by amplitude and phase calculation block 431. Similarly, in the quadrature channel, mixer 422 may extract the quadrature component of amplified sensor signal ϕ, low-pass filter 426 may filter out the phase-shifted oscillation signal mixed with the amplified sensor signal ϕ to generate a direct current (DC) quadrature component, and ADC 430 may convert such DC quadrature component into an equivalent quadrature component digital signal for processing by amplitude and phase calculation block 431.

Amplitude and phase calculation block 431 may include any system, device, or apparatus configured to receive phase information comprising the incident component digital signal and the quadrature component digital signal and based thereon, extract amplitude and phase information.

DSP 432 may include any system, device, or apparatus configured to interpret and/or execute program instructions and/or process data. In particular, DSP 432 may receive the phase information and the amplitude information generated by amplitude and phase calculation block 431 and based thereon, determine a displacement of mechanical member 305 relative to resistive-inductive-capacitive sensor 402, which may be indicative of an occurrence of a physical interaction (e.g., press or release of a virtual button or other interaction with a virtual interface) associated with a human-machine interface associated with mechanical member 305 based on the phase information. DSP 432 may also generate an output signal indicative of the displacement. In some embodiments, such output signal may comprise a control signal for controlling mechanical vibration of linear resonant actuator 107 in response to the displacement.

The phase information generated by amplitude and phase calculation block 431 may be subtracted from a reference phase $\phi_{ref}$ by combiner 450 in order to generate an error signal that may be received by low-pass filter 434. Low-pass filter 434 may low-pass filter the error signal, and such filtered error signal may be applied to VCO 416 to modify the frequency of the oscillation signal generated by VCO 416, in order to drive sensor signal ϕ towards reference phase $\phi_{ref}$. As a result, sensor signal ϕ may comprise a transient decaying signal in response to a "press" of a virtual button (or other interaction with a virtual interface) associated with system 400 as well as another transient decaying signal in response to a subsequent "release" of the virtual button (or other interaction with a virtual interface). Accordingly, low-pass filter 434 in connection with VCO 416 may implement a feedback control loop that may track changes in operating parameters of system 400 by modifying the driving frequency of VCO 416.

Baseline calculation engine 452 may comprise any system, device, or apparatus configured to, as described in greater detail below, calculate an appropriate baseline sensor input for processing a sensor signal ϕ as a user interaction with force sensor 105/mechanical member 305 in order to discriminate between user interactions and anomalous force sensor 105/mechanical member 305 sensor signal ϕ variations, such as those caused by drift of physical parameters (e.g., aging, temperature, etc.) of force sensor 105, mechanical member 305, resonant phase sensing system 113, etc. Although FIG. 4 depicts that, in some embodiments, baseline calculation engine 452 is external to DSP 432, in some embodiments, functionality of baseline calculation engine 452 may be implemented in whole or part by DSP 432.

Although the foregoing contemplates use of closed-loop feedback for sensing of displacement, the various embodiments represented by FIG. 4 may be modified to implement an open-loop system for sensing of displacement. In such an open-loop system, a processing IC may include no feedback path from amplitude and phase calculation block 431 to VCO 416 or variable phase shifter 418 and thus may also lack a feedback low-pass filter 434. Thus, a phase measurement may still be made by comparing a change in phase to a reference phase value, but the oscillation frequency driven by VCO 416 may not be modified or the phase shifted by variable phase shifter 418 may not be shifted.

Although the foregoing contemplates use of a coherent incident/quadrature detector as a phase detector for determining phase information associated with resistive-inductive-capacitive sensor 402, a resonant phase sensing system 112 may perform phase detection and/or otherwise determine phase information associated with resistive-inductive-capacitive sensor 402 in any suitable manner, including, without limitation, using only one of the incident path or quadrature path to determine phase information.

In some embodiments, an incident/quadrature detector as disclosed herein may include one or more frequency translation stages that translate the sensor signal into direct-current signal directly or into an intermediate frequency signal and then into a direct-current signal. Any of such frequency translation stages may be implemented either digitally after an analog-to-digital converter stage or in analog before an analog-to-digital converter stage.

In addition, although the foregoing contemplates measuring changes in resistance and inductance in resistive-inductive-capacitive sensor 402 caused by displacement of mechanical member 305, other embodiments may operate based on a principle that any change in impedance based on displacement of mechanical member 305 may be used to sense displacement. For example, in some embodiments, displacement of mechanical member 305 may cause a change in a capacitance of resistive-inductive-capacitive sensor 402, such as if mechanical member 305 included a metal plate implementing one of the capacitive plates of capacitor 406.

Although DSP 432 may be capable of processing phase information to make a binary determination of whether physical interaction associated with a human-machine interface associated with mechanical member 305 has occurred and/or ceased to occur, in some embodiments, DSP 432 may quantify a duration of a displacement of mechanical member 305 to more than one detection threshold, for example to detect different types of physical interactions (e.g., a short press of a virtual button versus a long press of the virtual button). In these and other embodiments, DSP 432 may quantify a magnitude of the displacement to more than one detection threshold, for example to detect different types of physical interactions (e.g., a light press of a virtual button versus a quick and hard press of the virtual button).

Although FIG. 4 and the description thereof depicts particular embodiments of a resonant phase sensing system, other architectures for force sensing may be used consistent with this disclosure, including without limitation the various resonant phase sensing system architectures described in U.S. patent application Ser. No. 16/267,079, filed Feb. 4, 2019. Thus, while baseline calculation engine 452 is discussed herein in relation to operation in connection with a resonant phase sensing system, baseline calculation engine 452 may be used with any other suitable force sensing system.

Accordingly, using the systems and methods described above, a resistive-inductor-capacitive sensor is provided wherein part of the inductive component is exposed to the user in the form of a metal plate of a region of a chassis or enclosure (e.g., enclosure 101). As such, displacements in the metal plate or enclosure may correlate to changes in measured phase or amplitude. Intentional displacements due to human interaction may tend to have faster slew rates at system output than displacements or other system changes due to input not from intentional human interaction, such as aging or temperature drift in the metal plate or inductive sensor.

A simple high-pass filter on a signal of interest may be used to cancel undesired inputs not indicative of intentional human interaction. However, such an approach may not be sufficient to sense more complex human interactions for which sensing may be desirable. In addition, such a high-pass filter solution may be less useful when multi-level detection is desired.

Figure 5:
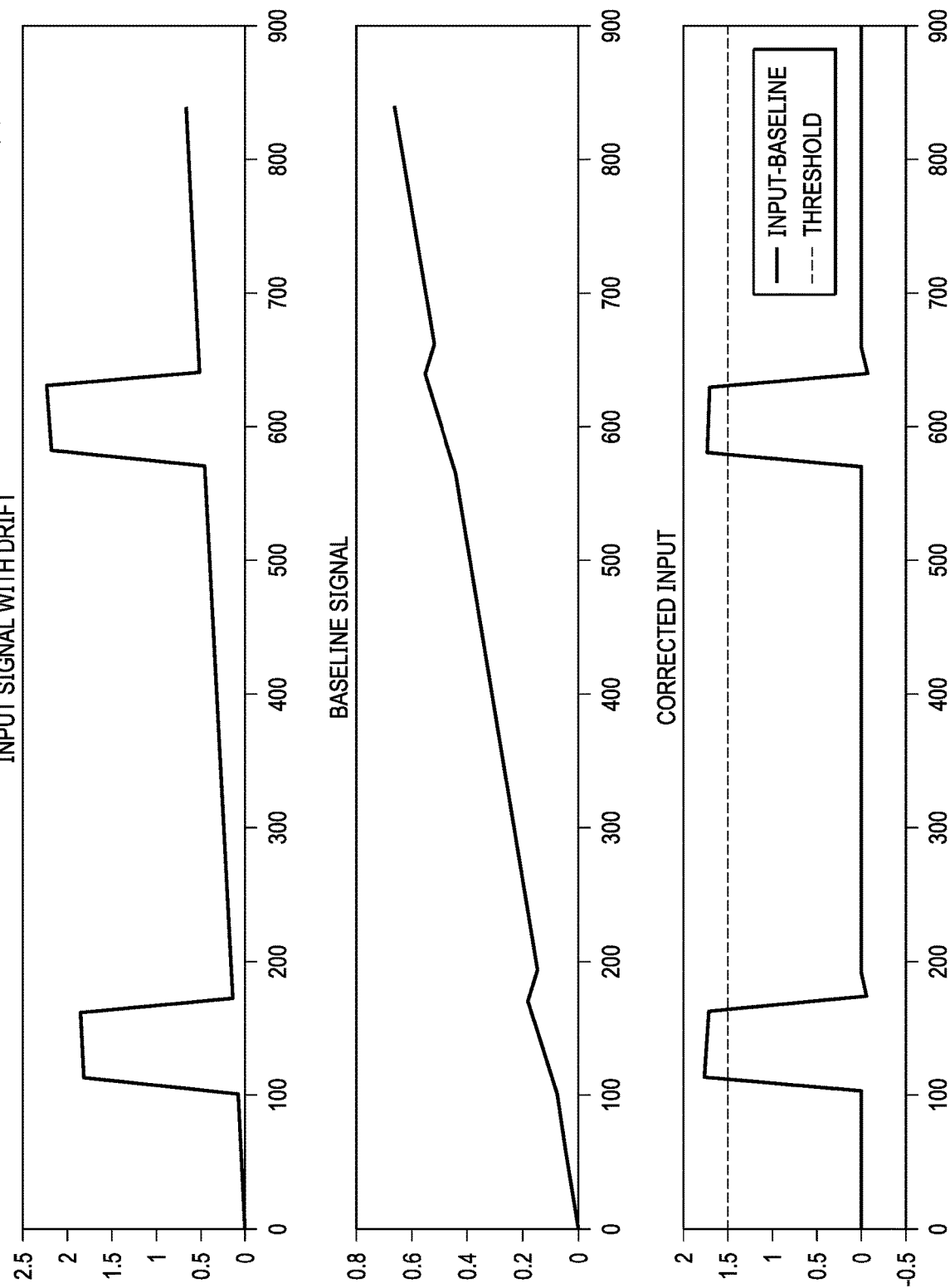
FIG. 5 illustrates example waveforms of example operation of a sensor system wherein a baseline signal is subtracted from a sensor input signal to provide a corrected sensor input signal, in accordance with embodiments of the present disclosure.

Establishing a variable baseline value in a detection system may be useful for isolating an actual signal of interest. If the baseline is designed to track only slow-moving inputs below a range of interest (e.g., essentially a low-pass filtered version of the sensor input signal), subtracting the baseline from the sensor input signal may yield the actual signal of interest (e.g., essentially resulting in a high-pass filtered version of the input). FIG. 5 illustrates example operation of a system (e.g., system 400) using such an approach, wherein a baseline signal representative of sensor input drift is subtracted from a sensor input signal (e.g., sensor signal 4) to provide a corrected sensor input signal.

Figure 6:
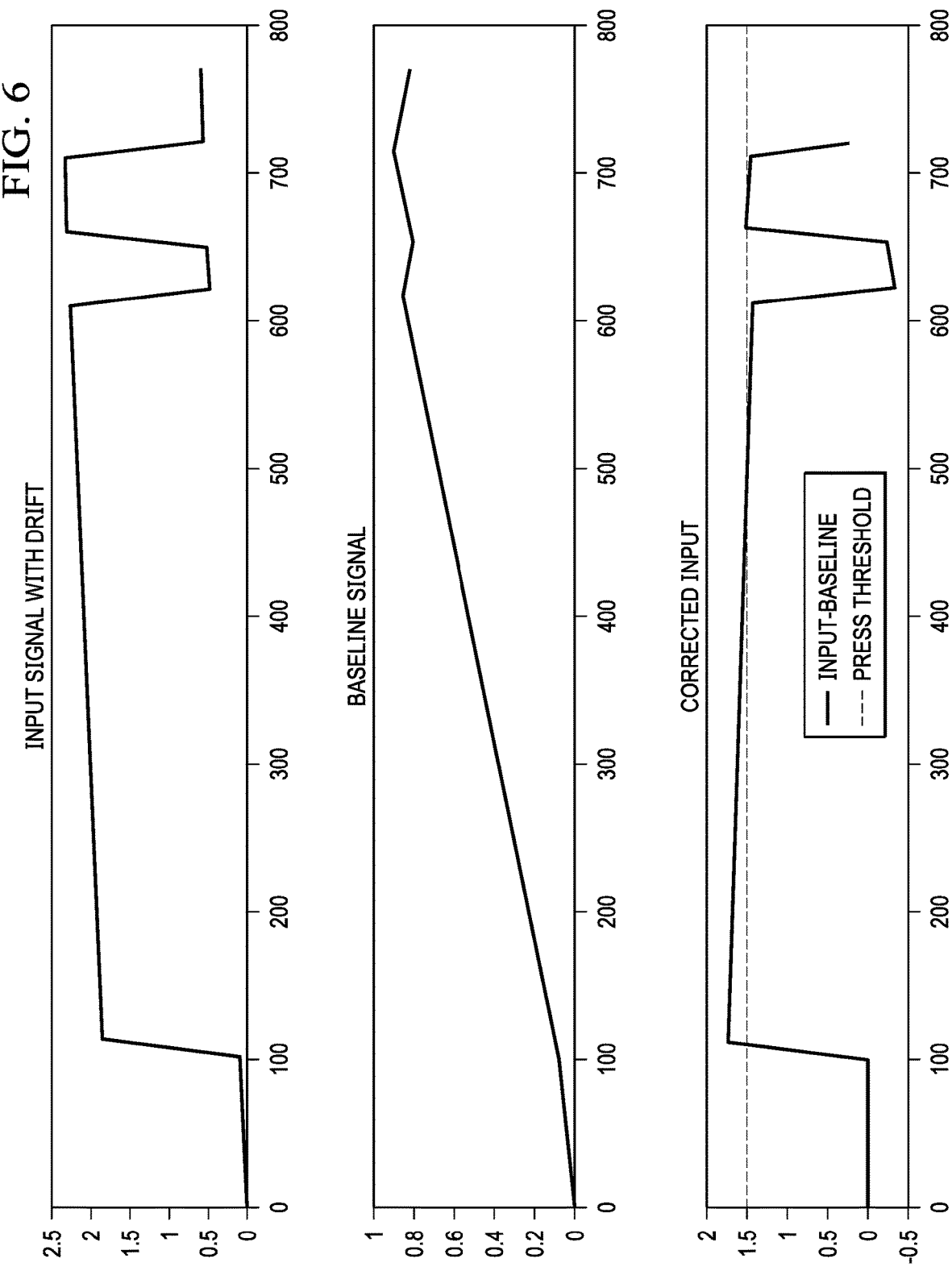
FIG. 6 illustrates example waveforms of example operation of a sensor system wherein a baseline signal is subtracted from a sensor input signal to provide a corrected sensor input signal in the presence of an intentional human interaction having a long duration, in accordance with embodiments of the present disclosure.

However, disadvantages of the approach shown in FIG. 5 may be seen when it is desired to detect intentional human interactions having long durations of time (e.g., long button presses), as shown in FIG. 6. At least two reasons may account for such disadvantages. First, the corrected measurement for the sensor input signal may trend towards zero over a time period defined by a baseline filter bandwidth and measurement delta, meaning an intentional sensor displacement for a time longer than this time period may not be accurately discerned. This is seen in FIG. 6, wherein a corrected sensor input signal drops below an input threshold level (labeled as "press threshold") in the course of a long-duration intentional human interaction. Second, intentional human interactions following a long-duration intentional human interaction may not be detected due to the corrected sensor input signal never exceeding the input threshold level, on account of the significant correction applied by the baseline signal.

Figure 7:
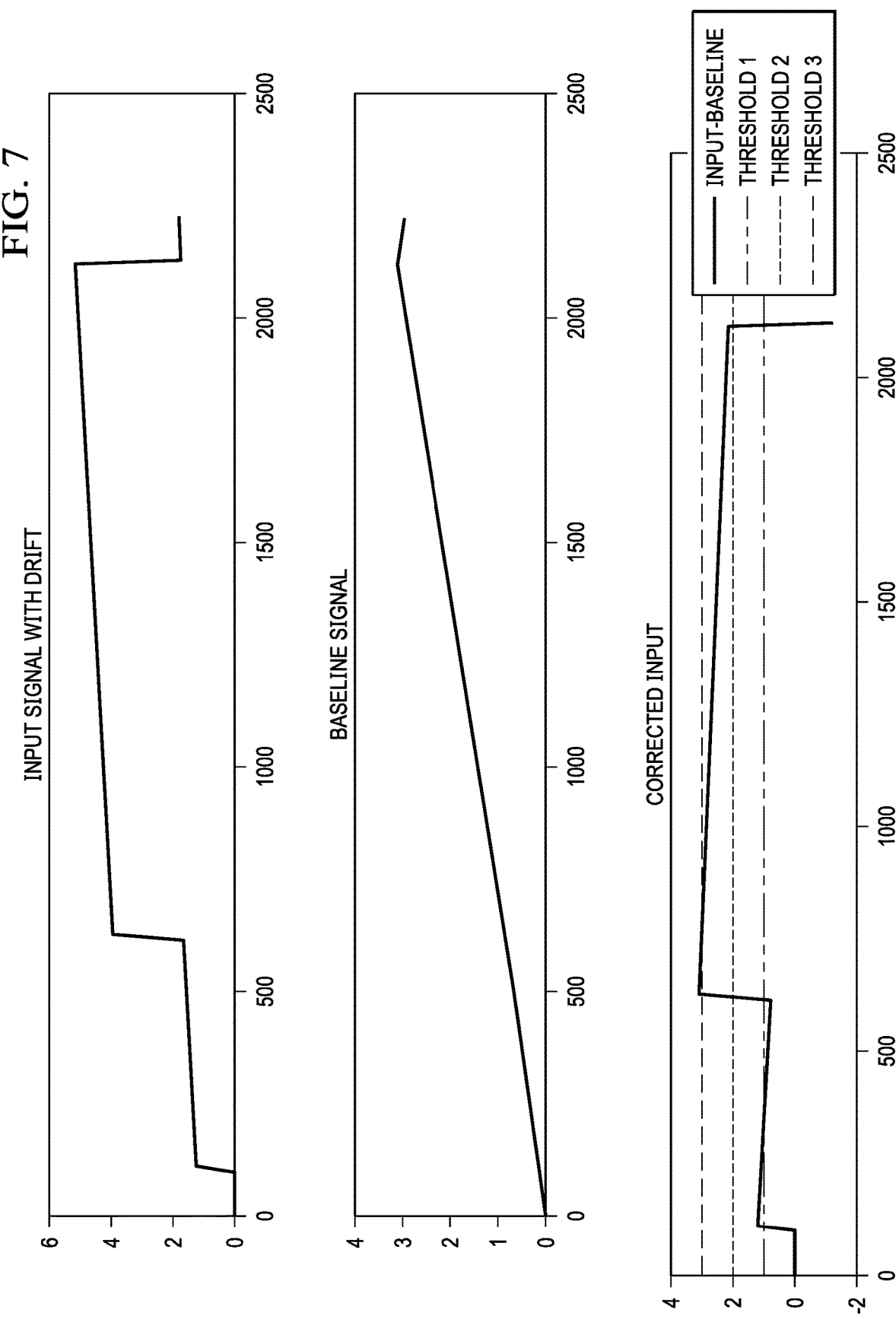
FIG. 7 illustrates example waveforms of example operation of a sensor system wherein a baseline signal is subtracted from a sensor input signal to provide a corrected sensor input signal in the presence of multiple input signal thresholds, in accordance with embodiments of the present disclosure.

Further disadvantages with of the approach shown in FIG. 5 may be seen when it is desired to detect intentional human interactions at multiple input threshold levels, as shown in FIG. 7. For example, in the approach shown in FIG. 7, a flag may be asserted each time the corrected input signal exceeds a defined threshold of a plurality of thresholds. However, as a user maintains intentional interaction at a particular level, all the previously asserted flags may begin to successively de-assert as the corrected input signal trends toward zero.

Figure 8:
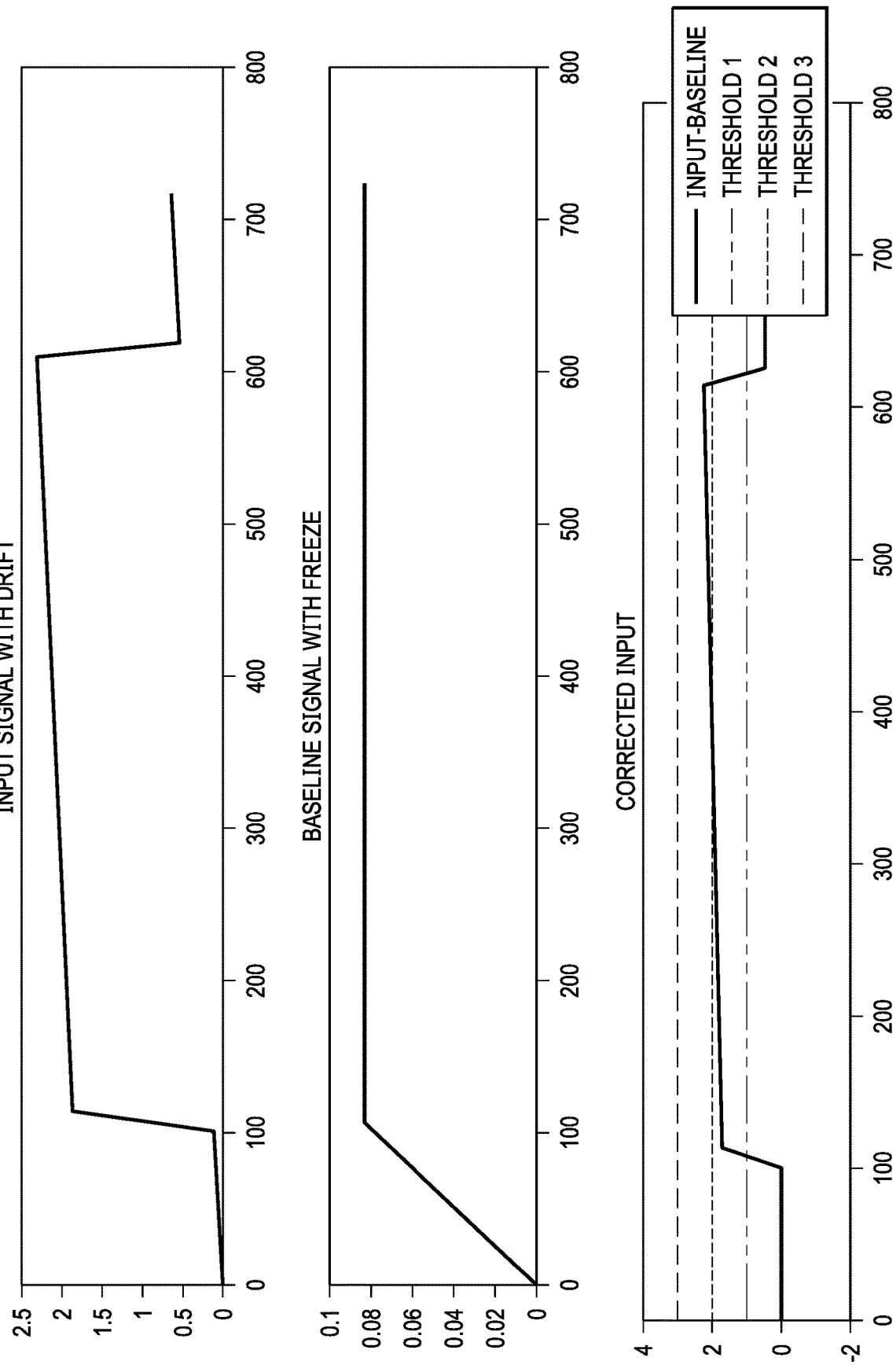
FIG. 8 illustrates example waveforms of example operation of a sensor system wherein a baseline signal is subtracted from a sensor input signal to provide a corrected sensor input signal wherein the baseline signal is frozen during a detected intentional human interaction, in accordance with embodiments of the present disclosure.

FIG. 8 illustrates example operation of a system (e.g., system 400) using another, wherein a baseline signal representative of sensor input drift is subtracted from a sensor input signal (e.g., sensor signal 4)) to provide a corrected sensor input signal, and the baseline signal is frozen during a detected intentional human interaction. The approach depicted in FIG. 8 may overcome the disadvantages of the approach shown in FIG. 5, but introduces its own disadvantages, as any slow-moving changes that occur during an intentional human interaction may not be tracked. For example, as shown in FIG. 8, the corrected input signal may trigger the threshold labeled "Threshold 2" shown in FIG. 8, due to constant drift of the original input signal.

To overcome these disadvantages, baseline calculation engine 452 may control behavior of the baseline signal such that the baseline signal "snaps" toward the sensor input signal once the sensor input signal has exceeded a threshold of interest. Once such threshold is crossed, the adjusted baseline signal may be considered the new starting point from which future baseline signal adjustments made be made. Such an approach may prevent a corrected input signal from falling out of range of a currently-exceeded threshold of interest due to baseline tracking of slow-moving effects. In addition, such an approach may allow slow-moving effects to be tracked while in a particular threshold range.

Figure 9:
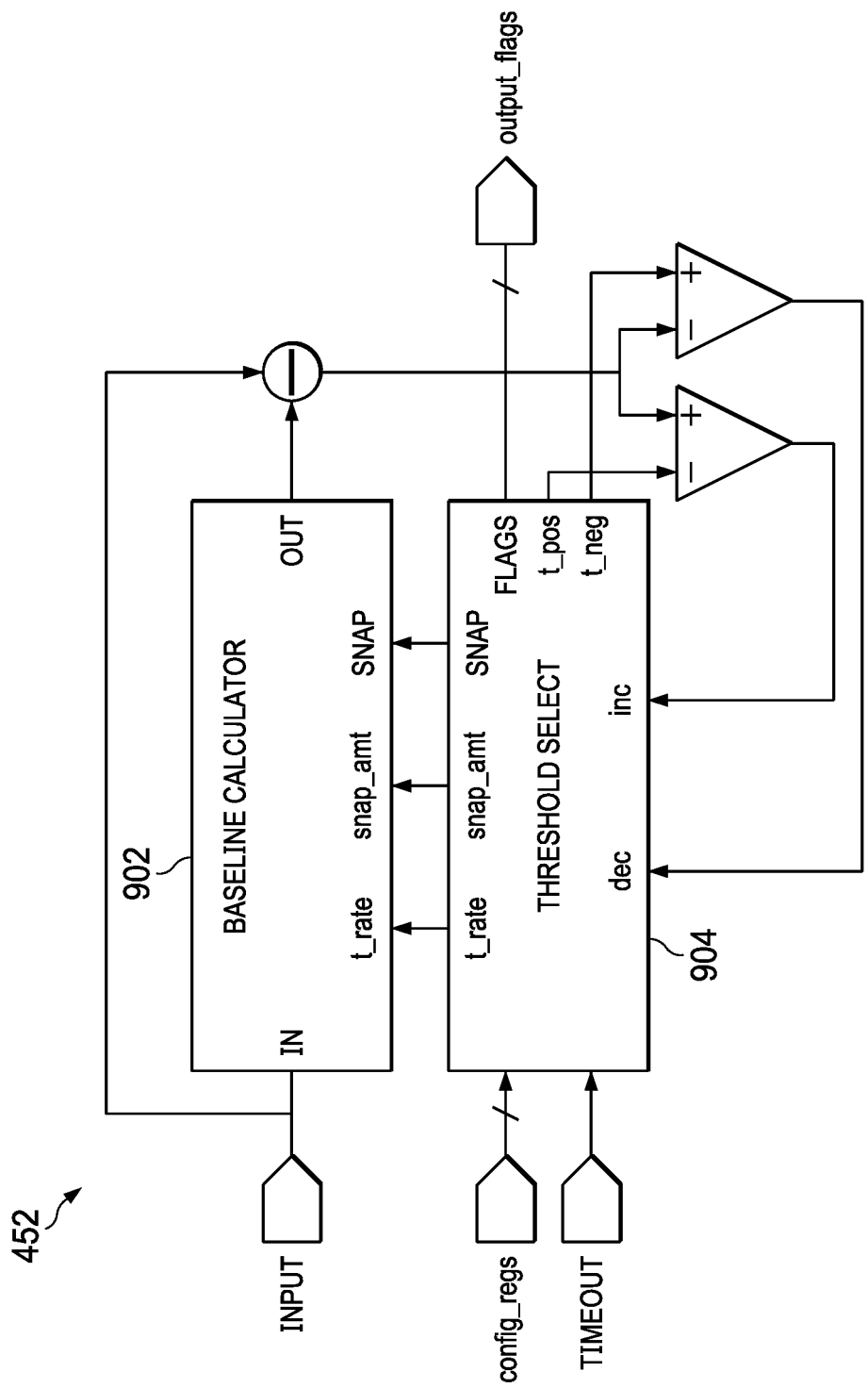
FIG. 9 illustrates a block diagram of selected components of an example baseline calculation engine, in accordance with embodiments of the present disclosure.

FIG. 9 illustrates a block diagram of selected components of an example baseline calculation engine 452, in accordance with embodiments of the present disclosure. As shown in FIG. 9, baseline calculation engine 452 may include baseline calculator block 902 and a threshold selection block 904. Baseline calculator block 902 may comprise, for example, any type of filter block, examples of which could include a low-pass filter or other type of programmable-rate tracking circuit, with the ability to reset its level in response to an external command Example operation of baseline calculator block 902 is described in greater detail below. Threshold selection block 904 may implement a plurality of input signal level thresholds and state information that may be used to indicate which thresholds have been exceeded due to intentional human interaction, as well as the ability to signal baseline calculator block 904 to instantaneously adjust its output by defined amounts.

FIG. 10 illustrates example waveforms depicting example operation of baseline calculation engine 452 shown in FIG. 9, in accordance with embodiments of the present disclosure. As shown in FIG. 10, initially a sensor (e.g., force sensor 105; mechanical member 305) of a human-system interface may be at rest. Subsequently, a user may interact with the sensor such that a displacement of a threshold amount is registered by baseline calculation engine 452. Once the input signal minus the baseline signal exceeds the threshold amount required to transition to a next threshold level, threshold selection block 904 may assert flags indicative of a transition to the next threshold level (as indicated by the "level decode" waveform) and baseline calculator block 902 may increase the baseline signal by the same threshold amount. At this point, the user may maintain steady force upon the human-system interface, but an input drift may be present within the bandwidth of baseline calculator block 902 and thus the baseline signal tracks the drift of the input signal. After some time has passed, the user may apply additional force upon the human-system interface corresponding to an increase of force more than two additional threshold levels, which may cause transitions to such two threshold levels, threshold selection block 904 to generate flags indicative of the transition through the two threshold levels (as indicated by the level decode waveform), and baseline calculator block 902 to adjust the baseline signal up an additional two threshold levels. At this point, the user may again maintain constant force to the human-system interface, and again an input drift may be present within the bandwidth of baseline calculator and thus the baseline signal tracks the drift of the input signal. After some time, the user may release the force applied to the human-system interface, resulting in a decrease in three threshold levels being registered by baseline calculation engine 452 (as indicated by the level decode waveform). At this point, even though the input signal may no longer match its initial level due to cumulative input drift, the corrected output as represented by the level decode waveform may indicate a "return-to-zero" condition that models user intent.

For a multi-level snapping baseline as illustrated above, it will be understood that each individual threshold level may be representative of a different button detection event (e.g., soft press, medium press, hard press). Alternatively, a system implementing the multi-level snapping baseline may be used to quantize the snapping events for a single human interaction detection event as a binary event, where the binary detection event occurs on the uppermost level, with any intervening levels used to snap the baseline within an acceptable drift window per the user.

In these and other embodiments, baseline calculation engine 452 may be configured to communicate to an external processing module the extent of the signal being cancelled by the snapping baseline generated by baseline calculation engine 452. In such a system, the external processing module may maintain an external baseline, where the external baseline may be incremented and decremented the same amount as the internal snapping baseline, except for when the input transitions from one level to another. For such transitions, the internal snapping baseline may be incremented or decremented by the threshold amount, but the external baseline does not change. Such approach may allow for processing of the signal without degrading signal to noise ratio due to the snapping process.

It is understood that the above-described methods may be implemented in a baseline calculation engine 452 as shown and described above. Baseline calculation engine 452 may be provided as an integral part of the sensor system (e.g., resonant phase sensing system 113 or system 400) or may be provided as part of a centralized controller such as a central processing unit or applications processor (e.g., controller 103). It is also understood that baseline calculation engine 452 may be provided with a suitable memory storage module (e.g., memory 104) for storing data for use in the above-described approach.

Figure 11A:
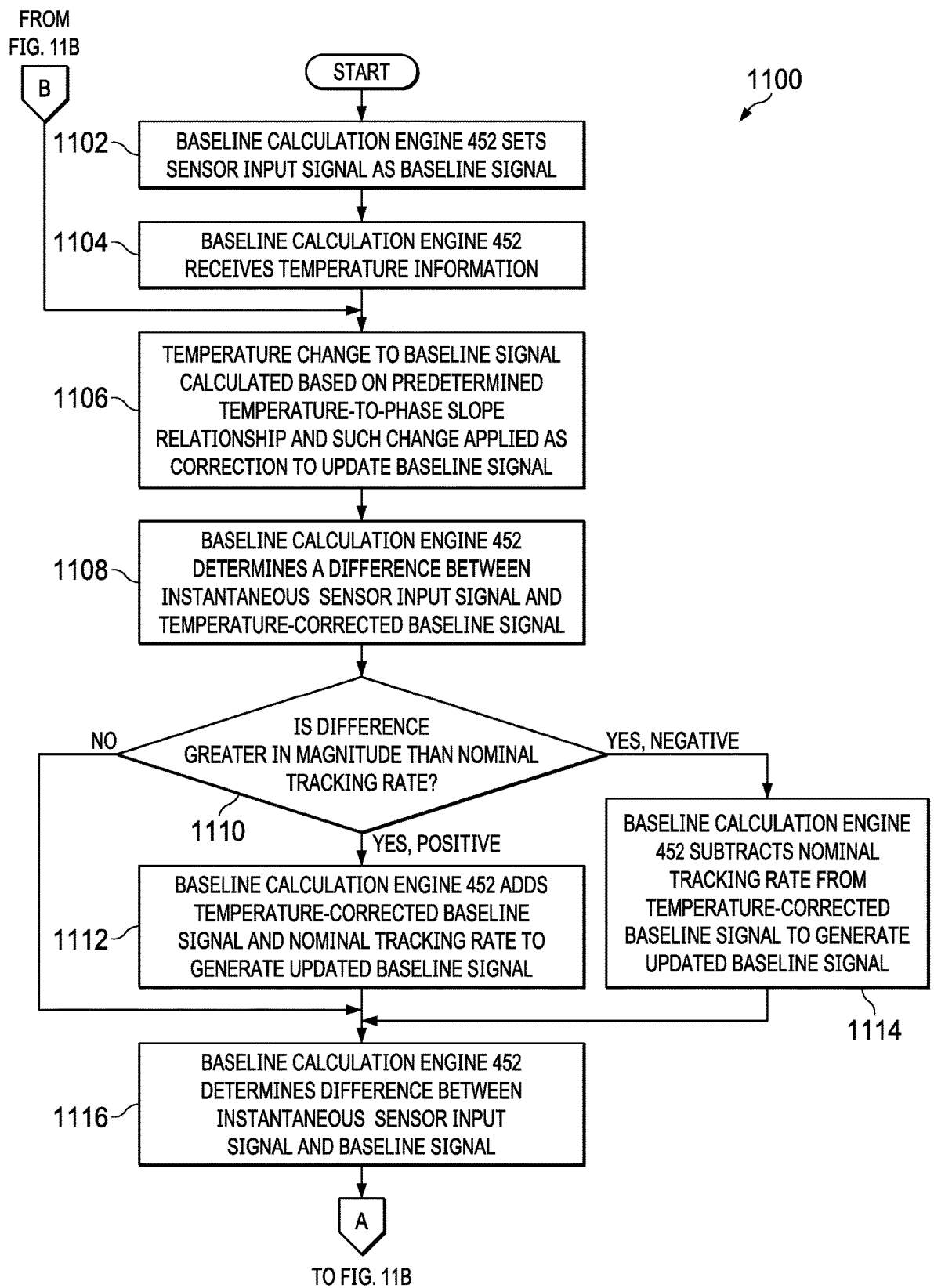
FIGS. 11A and 11B (which may collectively be referred to herein as "FIG. 11") illustrate a flow chart of an example method for temperature-based baseline tracking, in accordance with embodiments of the present disclosure.
Figure 11B:
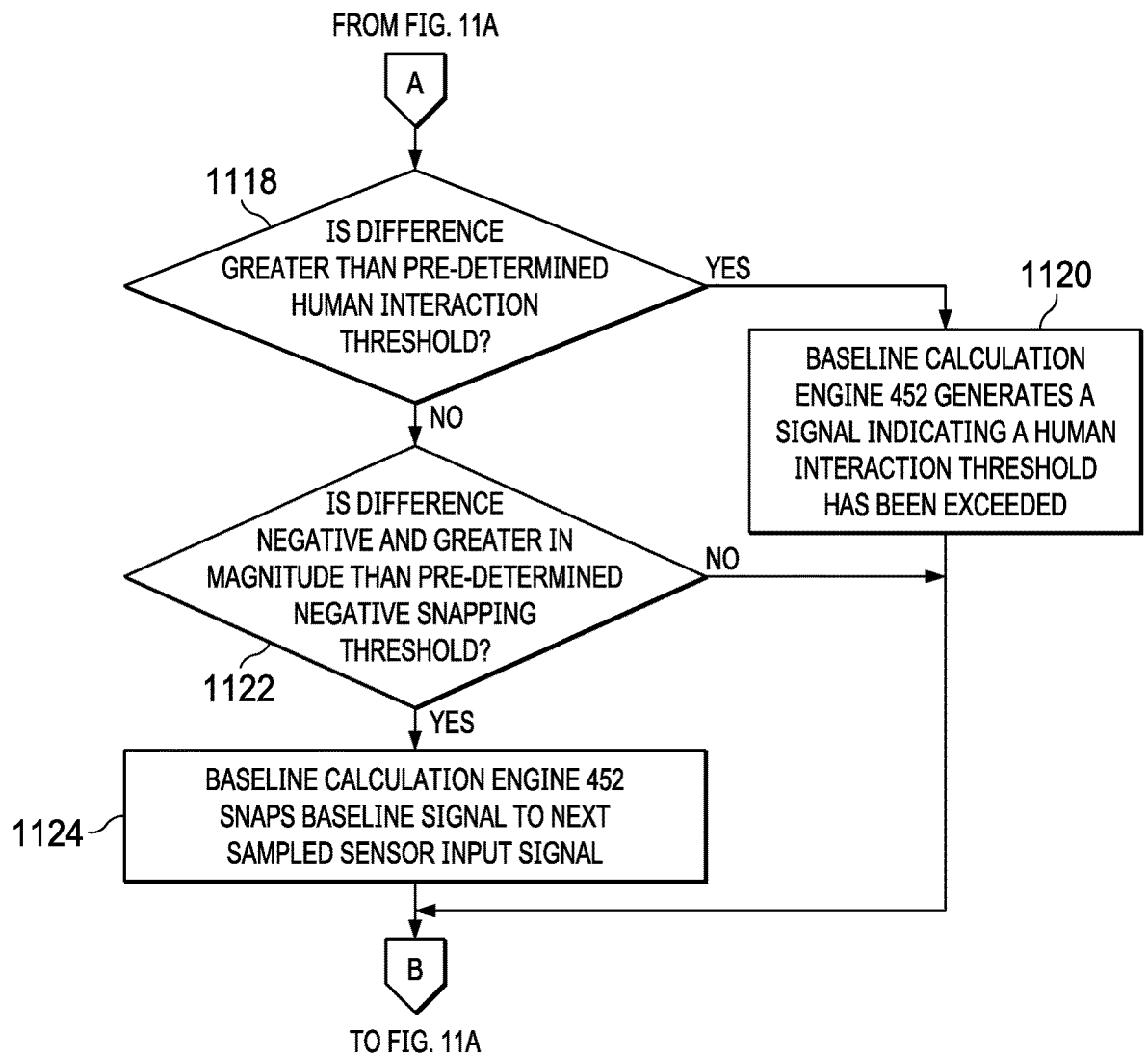
Figure 12:
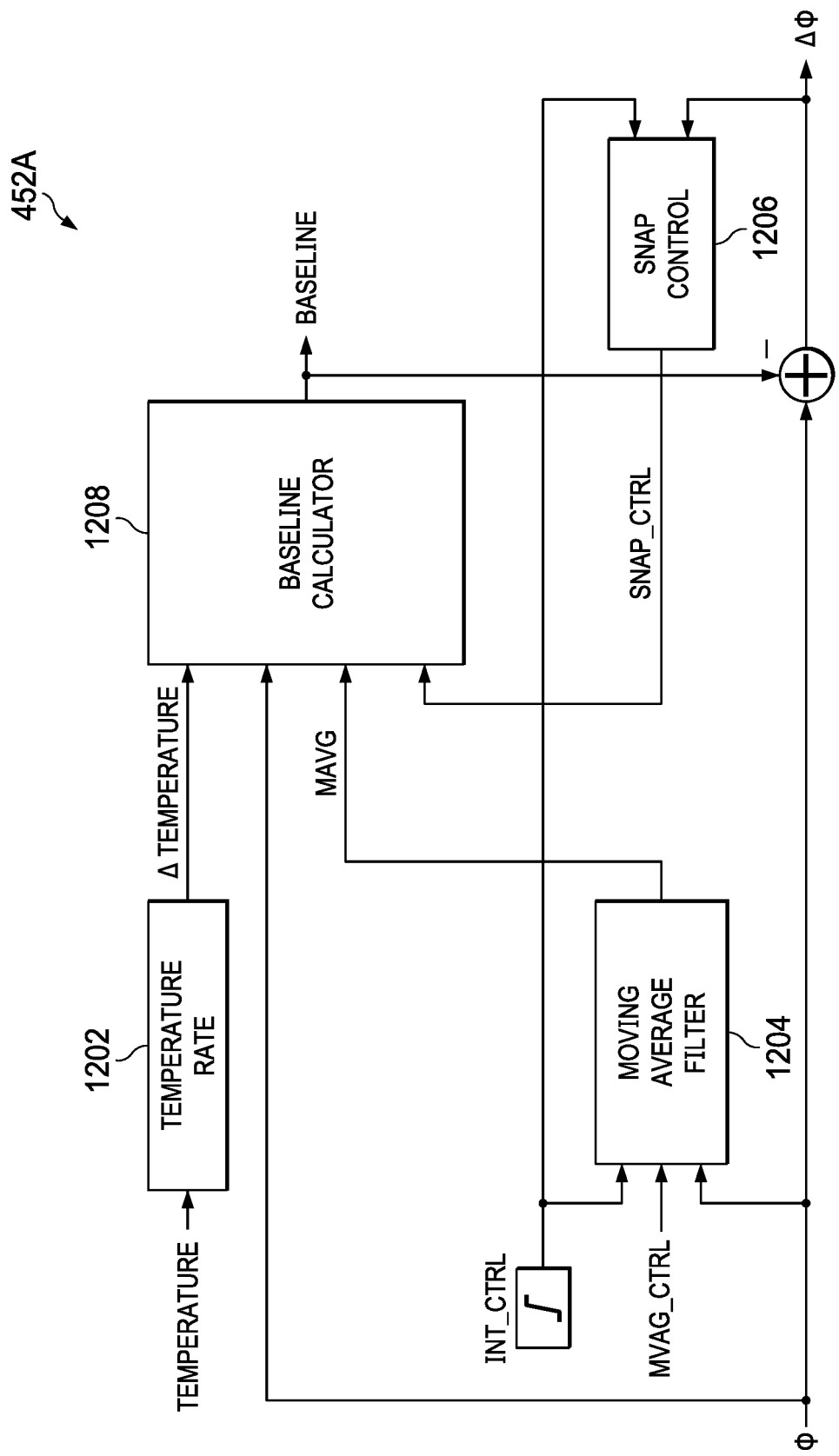
FIG. 12 illustrates a block diagram of selected components of an example baseline calculation engine using temperature-based baseline tracking, in accordance with embodiments of the present disclosure.

In addition to or in lieu of the baseline tracking approach set forth above, in some embodiments, a baseline calculation engine may be configured to vary the baseline signal based on changes in temperature, including snapping for negative-only phase changes. For example, FIG. 11 illustrates a flow chart of an example method 1100 for temperature-based baseline tracking, in accordance with embodiments of the present disclosure. FIG. 12 illustrates a block diagram of selected components of an example baseline calculation engine 452A using temperature-based baseline tracking, in accordance with embodiments of the present disclosure.

According to some embodiments, method 1100 may begin at step 1102. As noted above, teachings of the present disclosure may be implemented in a variety of configurations of system 400 and/or processing IC 412. As such, the preferred initialization point for method 1100 and the order of the steps comprising method 1100 may depend on the implementation chosen.

At step 1102, upon powering up of processing IC 412, baseline calculation engine 452A may set the first-received sensor input signal (e.g., sensor signal $\phi$) as a baseline signal BASELINE. At step 1104, baseline calculation engine 452A may receive temperature information TEMP (e.g., from a suitable temperature sensor, not explicitly shown in the figures) at temperature rate block 1202 which may calculate a rate of change $\Delta$TEMP of the sensed temperature TEMP. At step 1106, baseline calculator 1208 of baseline calculation engine 452A may calculate a temperature change to the baseline signal based on a predetermined temperature-to-phase slope relationship, and such change may be applied as a correction to update the baseline signal BASELINE based on temperature change.

At step 1108, baseline calculation engine 452A may determine a difference $\Delta\phi$ between an instantaneous sensor input signal (e.g., sensor signal ϕ) and the temperature-corrected baseline signal. At step 1110, baseline calculation engine 452A may determine if the difference is greater than a nominal tracking rate, wherein the nominal tracking rate may represent a system phase drift rate in the absence of temperature change. If the difference is positive and greater than the nominal tracking rate, method 1100 may proceed to step 1112. If the difference is negative and greater in magnitude than the nominal tracking rate, method 1100 may proceed to step 1114. Otherwise, method 1100 may proceed to step 1116.

At step 1112, responsive to the difference being positive and greater than the nominal tracking rate, baseline calculation engine 452A may add the temperature-corrected baseline signal and the nominal tracking rate to generate an updated baseline signal. After completion of step 1112, method 1100 may proceed to step 1116.

At step 1114, responsive to the difference being negative and greater in magnitude than the nominal tracking rate, baseline calculation engine 452A may subtract the nominal tracking rate from the temperature-corrected baseline signal to generate an updated baseline signal.

At step 1116, baseline calculation engine 452A may determine a difference between the instantaneous sensor input signal (e.g., sensor signal 4) and baseline signal (e.g., as may be updated at either of step 1112 or step 1114 above). At step 1118, baseline calculation engine 452A may compare the difference to a pre-determined human interaction threshold. If the difference is positive and greater than the pre-determined human interaction threshold, method 1100 may proceed to step 1120. Otherwise, method 1100 may proceed to step 1122.

At step 1120, responsive to the difference being positive and greater than the pre-determined human interaction threshold, baseline calculation engine 452A may generate a signal indicating a human interaction threshold has been exceeded, which may be indicative of actual human interaction with force sensor 105/mechanical member 305. After completion of step 1120, method 1100 may proceed again to step 1106.

At step 1122, baseline calculation engine 452 may compare the difference to a pre-determined negative snapping threshold using snap control block 1206. If the difference is negative and greater in magnitude than the pre-determined negative snapping threshold, method 1100 may proceed to step 1124. Otherwise, method 1100 may proceed again to step 1106.

At step 1124, responsive to the difference being negative and greater in magnitude than the pre-determined negative snapping threshold, baseline calculation engine 452A may use snap control block 1206 to snap the baseline signal to the output MAVG of moving average filter 1204, which may calculate a moving average of sensor signal ϕ. After completion of step 1124, method 1100 may proceed again to step 1106.

Although FIG. 11 discloses a particular number of steps to be taken with respect to method 1100, method 1100 may be executed with greater or fewer steps than those depicted in FIG. 11. In addition, although FIG. 11 discloses a certain order of steps to be taken with respect to method 1100, the steps comprising method 1100 may be completed in any suitable order.

Method 1100 may be implemented in whole or part using system 400, processing IC 412, and/or any other system operable to implement method 1100. In certain embodiments, method 1100 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method comprising:
   receiving an input signal;
   generating a baseline signal based on the input signal;
   generating a corrected input signal by subtracting the baseline signal from the input signal;
   determining a threshold level change of the input signal when the corrected input signal exceeds a level change threshold; and
   responsive to the threshold level change:
      updating the baseline signal to the level change threshold;
      generating an output flag indicative of the threshold level change; and
      outputting the generated output flag.

2. The method of claim 1, wherein determining the threshold level change comprises determining a number of a plurality of level change thresholds exceeded by the corrected input signal.

3. The method of claim 2, further comprising:
   determining a threshold level increase if the corrected input level exceeds a threshold for incrementing a threshold level of the input signal; and
   determining a threshold level decrease if the corrected input level falls below a threshold for decrementing the threshold level of the input signal.

4. The method of claim 1, wherein generating the baseline signal on the input signal comprises low-pass filtering the input signal.

5. The method of claim 1, wherein the input signal is generated by a force sensor.

6. The method of claim 5, wherein the force sensor is configured to sense a force associated with a human interaction with a virtual button.

7. The method of claim 5, wherein the force sensor comprises one of a capacitive displacement sensor, an inductive force sensor, a resistive-inductive-capacitive sensor, a strain gauge, a piezoelectric force sensor, a force sensing resistor, a thin film force sensor, or a quantum tunneling composite-based force sensor.

8. A system comprising:
   an input for receiving an input signal;
   an output for generating a baseline signal based on the input signal; and
   a baseline calculation engine configured to:
      generate a corrected input signal by subtracting the baseline signal from the input signal;
      determine a threshold level change of the input signal when the corrected input signal exceeds a level change threshold; and
      responsive to the threshold level:
      update the baseline signal to the level change threshold;
      generate an output flag indicative of the threshold level change; and
      output the generated output flag.

9. The system of claim 8, wherein determining the threshold level change comprises determining a number of a plurality of level change thresholds exceeded by the corrected input signal.

10. The system of claim 9, the baseline calculation engine further configured to:
   determine a threshold level increase if the corrected input level exceeds a threshold for incrementing a threshold level of the input signal; and
   determine a threshold level decrease if the corrected input level falls below a threshold for decrementing the threshold level of the input signal.

11. The system of claim 8, wherein generating the baseline signal on the input signal comprises low-pass filtering the input signal.

12. The system of claim 8, wherein the input signal is generated by a force sensor.

13. The system of claim 12, wherein the force sensor is configured to sense a force associated with a human interaction with a virtual button.

14. The system of claim 12, wherein the force sensor comprises one of a capacitive displacement sensor, an inductive force sensor, a resistive-inductive-capacitive sensor, a strain gauge, a piezoelectric force sensor, a force sensing resistor, a thin film force sensor, or a quantum tunneling composite-based force sensor.

* * * * *